US012695231B2

(12) United States Patent

Kanematsu et al.

(10) Patent No.: US 12,695,231 B2

(45) Date of Patent: Jul. 28, 2026

(54) TERMINAL UNIT AND FIRST TERMINAL

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yuta Kanematsu, Mie (JP); Sunghyun Byun, Mie (JP); Nobukazu Hirowaki, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 358 days.

(21) Appl. No.: 18/683,492

(22) PCT Filed: Aug. 2, 2022

(86) PCT No.: PCT/JP2022/029614

§ 371 (c)(1),
(2) Date: Feb. 13, 2024

(87) PCT Pub. No.: WO2023/021979

PCT Pub. Date: Feb. 23, 2023

(65) Prior Publication Data

US 2024/0356261 A1 Oct. 24, 2024

(30) Foreign Application Priority Data

Aug. 20, 2021 (JP) ................................ 2021-134965
Dec. 29, 2021 (JP) ................................ 2021-215377

(51) Int. Cl.
*H01R 13/11* (2006.01)
*H01R 13/05* (2006.01)
(Continued)

(52) U.S. Cl.
CPC ........... *H01R 13/18* (2013.01); *H01R 13/052* (2013.01); *H01R 13/447* (2013.01)

(58) Field of Classification Search
CPC .... H01R 13/18; H01R 13/052; H01R 13/447; H01R 11/12; H01R 13/11; H01R 13/44; H01R 13/04
See application file for complete search history.

(56) References Cited

U.S. PATENT DOCUMENTS 6,146,211 A * 11/2000 Okamoto .............. H01R 13/44
439/825
10,854,999 B1 * 12/2020 Price .................... H01R 13/659
(Continued)

FOREIGN PATENT DOCUMENTS

CN 206864645 U 1/2018
DE 102017213093 A1 1/2019
(Continued)

OTHER PUBLICATIONS

International Search Report issued on Oct. 25, 2022 for WO 2023/021979 A1 (6 pages).

*Primary Examiner* — Abdullah A Riyami
*Assistant Examiner* — Nelson R. Burgos-Guntin
(74) *Attorney, Agent, or Firm* — Venjuris, P.C.

(57) ABSTRACT

A terminal unit is provided with a first terminal including a columnar connecting portion and a resin cap having a maximum outer diameter larger than an outer diameter of the columnar connecting portion, and a second terminal including a tubular connecting portion. The columnar connecting portion is assembled by being press-fit into the tubular
(Continued)

connecting portion. The tubular connecting portion is expanded in diameter and deformed by the resin cap with the resin cap located in the tubular connecting portion, whereby second contact points provided on an inner peripheral surface of the tubular connecting portion are pushed in directions separating from a first contact point constituted by an outer peripheral surface of the columnar connecting portion. The second contact points are pressed into contact with the first contact point by a resilient restoring force of the tubular connecting portion with the resin cap arranged to project.

18 Claims, 19 Drawing Sheets

(51) Int. Cl.

| | |
|---|---|
| ***H01R 13/18*** | (2006.01) |
| ***H01R 13/447*** | (2006.01) |

(56) References Cited

U.S. PATENT DOCUMENTS

| | | | | |
|---|---|---|---|---|
| 2009/0042409 | A1* | 2/2009 | Yuan | H01R 13/112 439/59 |
| 2012/0295461 | A1* | 11/2012 | Hirabayashi | H01R 13/113 439/271 |
| 2013/0090012 | A1 | 4/2013 | Natter et al. | |
| 2013/0109250 | A1 | 5/2013 | Haga | |
| 2013/0244512 | A1* | 9/2013 | Endo | H01R 13/052 439/889 |
| 2015/0200481 | A1 | 7/2015 | Fukushima et al. | |
| 2016/0134044 | A1* | 5/2016 | Hirakawa | H01R 13/187 439/816 |
| 2017/0012379 | A1* | 1/2017 | Chen | F21K 9/27 |
| 2019/0006783 | A1* | 1/2019 | Nakazono | H01R 13/111 |
| 2019/0386432 | A1* | 12/2019 | Aoshima | H01R 13/631 |
| 2020/0266561 | A1* | 8/2020 | Li | H01R 13/11 |
| 2022/0285871 | A1 | 9/2022 | Nishijima et al. | |

FOREIGN PATENT DOCUMENTS

| | | | |
|---|---|---|---|
| EP | 0823753 | A1 | 2/1998 |
| JP | 2014-179290 | A | 9/2014 |
| JP | 2016-024901 | A | 2/2016 |
| KR | 10-1744470 | B1 | 6/2017 |
| WO | 01/73899 | A1 | 10/2001 |

* cited by examiner

TERMINAL UNIT AND FIRST TERMINAL

CROSS REFERENCE TO RELATED APPLICATIONS

This application is a national phase of PCT application No. PCT/JP2022/029614, filed on 2 Aug. 2022, which claims priority from Japanese patent application Nos. 2021-134965 and 2021-215377, filed on 20 Aug. 2021 and 29 Dec. 2021, to the Japan Patent Office, respectively, all of which are incorporated herein by reference.

TECHNICAL FIELD

The present disclosure relates to a terminal unit and a first terminal.

BACKGROUND

Patent Document 1 discloses a terminal unit for realizing an electrical connection structure by a male terminal (first terminal) called a pin terminal and including a columnar connecting portion and a female terminal (second terminal) called a sleeve terminal and including a tubular connecting portion. A resilient contact piece folded rearward from a tip opening is provided inside the tubular connecting portion of the second terminal. If the columnar connecting portion of the first terminal is inserted through the tip opening of the tubular connecting portion of the second terminal, the resilient contact piece contacted by the columnar connecting portion is expanded in diameter and deformed against a resilient restoring force, thereby allowing the entrance of the columnar connecting portion into the tubular connecting portion. By this resilient restoring force of the resilient contact piece, a contact point portion provided on an end part of the resilient contact piece is pressed by the columnar connecting portion of the first terminal and the first and second terminals are held in a contact state to realize electrical connection.

PRIOR ART DOCUMENT

Patent Document

Patent Document 1: JP 2016-024901 A

SUMMARY OF THE INVENTION

Problems to be Solved

In such a terminal unit having the conventional structure, the resilient contact piece of the tubular connecting portion moves while rubbing against a surface of the columnar connecting portion when the columnar connecting portion of the first terminal is press-fit into the tubular connecting portion of the second terminal. Thus, the plating of the columnar connecting portion and the tubular connecting portion is scraped by the repeated insertion and withdrawal of the first terminal into and from the second terminal, whereby there have been a possibility of causing troubles such as an increase in contact resistance.

Accordingly, novel terminal unit and first terminal are disclosed which can suppress the scraping of the plating of a columnar connecting portion and a tubular connecting portion.

Means to Solve the Problem

The present disclosure is directed to a terminal unit with a first terminal including a columnar connecting portion and a resin cap for covering a tip surface of the columnar connecting portion, the resin cap having a maximum outer diameter larger than that of the columnar connecting portion, and a second terminal including a tubular connecting portion resiliently deformable in a diameter expanding direction, the columnar connecting portion being assembled with the tubular connecting portion by being press-fit into the tubular connecting portion with the resin cap in the lead, the tubular connecting portion being expanded in diameter and deformed by the resin cap with the resin cap located in the tubular connecting portion, whereby a second contact point provided on an inner peripheral surface of the tubular connecting portion is pushed in a direction separating from a first contact point constituted by an outer peripheral surface of the columnar connecting portion, and the second contact point being pressed into contact with the first contact point by a resilient restoring force of the tubular connecting portion in a diameter reducing direction with the resin cap arranged to project from the tubular connecting portion toward a tip side in a press-fitting direction.

The present disclosure is also directed to a first terminal to be assembled with a second terminal including a tubular connecting portion resiliently deformable in a diameter expanding direction, the first terminal being provided with a columnar connecting portion to be press-fit into the tubular connecting portion, and a resin cap for covering a tip surface of the columnar connecting portion in a press-fitting direction into the tubular connecting portion, the resin cap having a maximum outer diameter larger than that of the columnar connecting portion, an outer peripheral surface of the columnar connecting portion constituting a first contact point to be pressed into contact with a second contact point provided on the tubular connecting portion, and the resin cap being arranged to project from the tubular connecting portion toward a tip side in the press-fitting direction at an assembly completed position of the columnar connecting portion with the tubular connecting portion.

Effect of the Invention

According to the present disclosure, the scraping of the plating of a columnar connecting portion and a tubular connecting portion can be suppressed.

DETAILED DESCRIPTION TO EXECUTE THE INVENTION

Description of Embodiments of Present Disclosure

Figure 1:
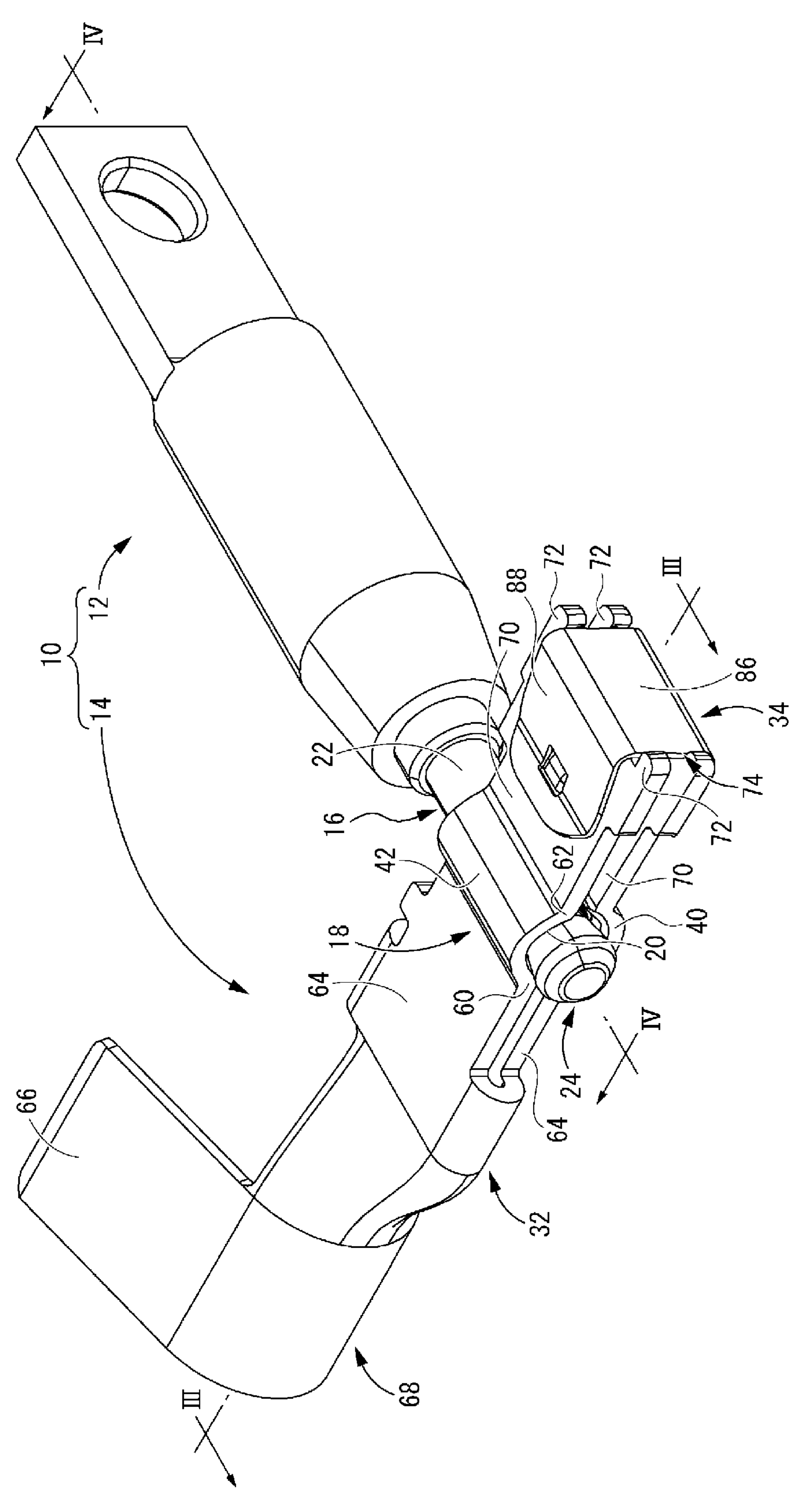
FIG. 1 is a perspective view of a terminal unit according to a first embodiment.
Figure 2:
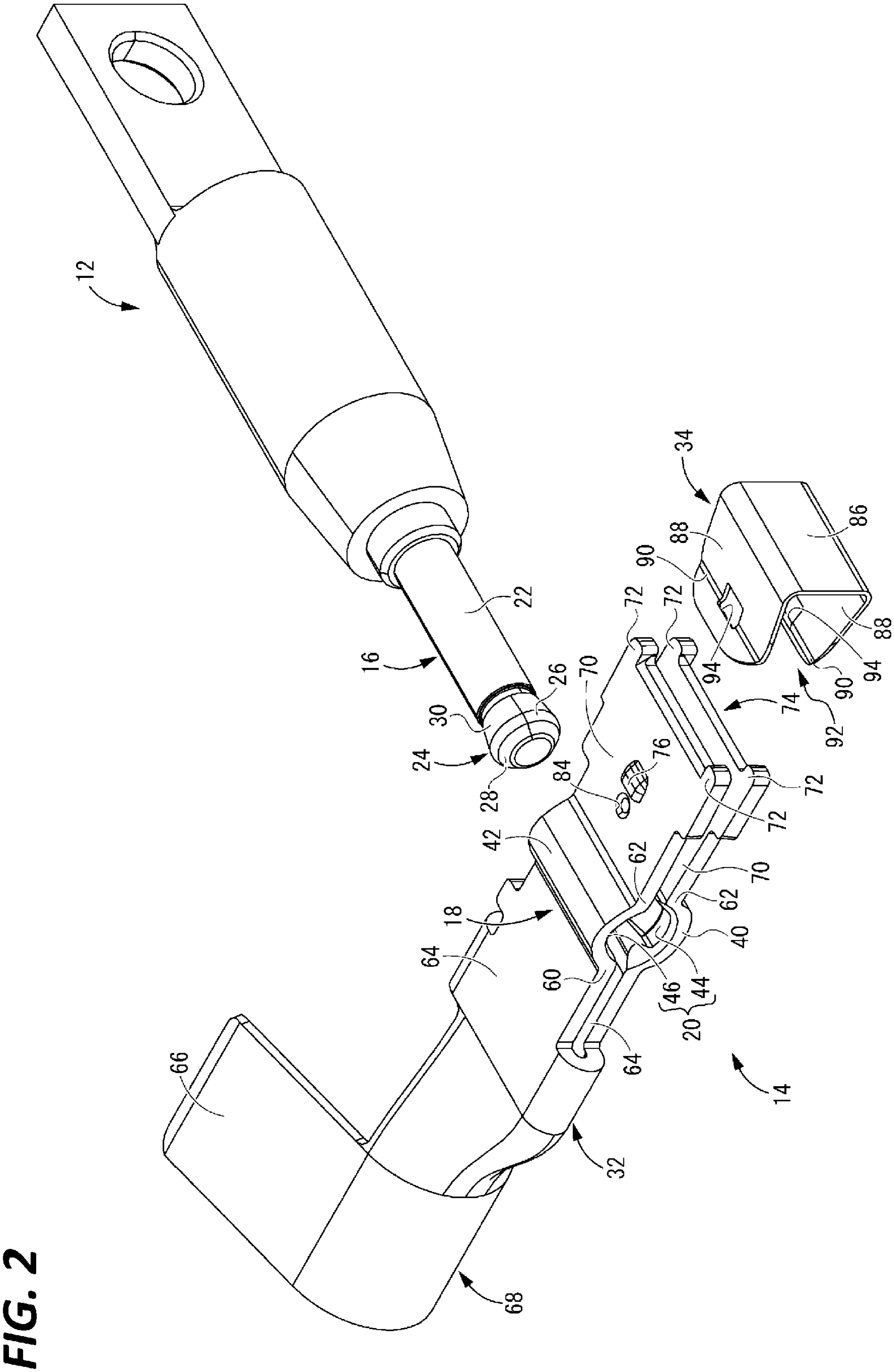
FIG. 2 is an exploded perspective view of the terminal unit shown in FIG. 1.

First, embodiments of the present disclosure are listed and described.

(1) The terminal unit of the present disclosure is provided with a first terminal including a columnar connecting portion and a resin cap for covering a tip surface of the columnar connecting portion, the resin cap having a maximum outer diameter larger than that of the columnar connecting portion, and a second terminal including a tubular connecting portion resiliently deformable in a diameter expanding direction, the columnar connecting portion being assembled with the tubular connecting portion by being press-fit into the tubular connecting portion with the resin cap in the lead, the tubular connecting portion being expanded in diameter and deformed by the resin cap with the resin cap located in the tubular connecting portion, whereby a second contact point provided on an inner peripheral surface of the tubular connecting portion is pushed in a direction separating from a first contact point constituted by an outer peripheral surface of the columnar connecting portion, and the second contact point being pressed into contact with the first contact point by a resilient restoring force of the tubular connecting portion in a diameter reducing direction with the resin cap arranged to project from the tubular connecting portion toward a tip side in a press-fitting direction.

According to the terminal unit of this structure, the maximum outer diameter of the resin cap for covering the tip surface of the columnar connecting portion of the first terminal is larger than that of the columnar connecting portion. Thus, in press-fitting the columnar connecting portion of the first terminal into the tubular connecting portion of the second terminal, an inner diameter of the tubular connecting portion is first expanded to a dimension larger than the outer diameter of the columnar connecting portion by the resin cap. As a result, in assembling the first and second terminals, a part where a maximum surface pressure necessary for the expansion of the tubular connecting portion in the diameter expanding direction can be constituted by sliding surfaces by the outer surface (resin) of the resin cap of the first terminal and the inner surface (metal) of the tubular connecting portion of the second terminal. As a result, the scraping of the plating of the inner peripheral surface of the tubular connecting portion including the second contact point and the outer peripheral surface of the columnar connecting portion including the first contact point can be advantageously suppressed and the occurrence of troubles such as an increase in contact resistance between the first and second contact points can also be suppressed as compared to a structure in which a maximum surface pressure is generated on sliding surfaces by the outer surface (metal) of the columnar connecting portion of the first terminal and the inner surface (metal) of the tubular connecting portion of the second terminal as before.

Further, in a state before the completion of the assembly of the both terminals where the resin cap of the first terminal is located in the tubular connecting portion, the tubular connecting portion is resiliently deformed in the diameter expanding direction by the resin cap. Thus, the second contact point provided on the inner peripheral surface of the tubular connecting portion is pushed in the direction separating from the first contact point constituted by the outer peripheral surface of the columnar connecting portion. In this way, a biasing force of the second contact point toward the first contact point is reduced and it is possible to separate the second contact point from the first contact point when the resin cap slides in the tubular connecting portion and reduce a contact pressure between the both contact points by as much as a force is applied to the tubular connecting portion in the direction separating from the first contact point even if the resin cap slides in contact with the tubular connecting portion. As a result, the occurrence of sliding wear of the first and second contact points can be prevented or suppressed.

In addition, in a state after the completion of the assembly of the both terminals where the resin cap is arranged to project from the tubular connecting portion toward the tip side in the press-fitting direction, the expansive deformation of the tubular connecting portion by the resin cap is released and the second contact point is pressed into contact with the first contact point by the resilient restoring force of the tubular connecting portion in the diameter reducing direction. In this way, the state where the first contact point of the columnar connecting portion of the first terminal and the second contact point of the tubular connecting portion of the second terminal are pressed in contact can be stably maintained.

Note that, in the case of applying the first terminal of this mode as a high-voltage terminal of an electric vehicle or the like, the resin cap can also be used as a finger contact preventing cap, serving as a measure against electric shock of the first terminal, and both an effect of preventing wear due to the insertion and withdrawal of the columnar connecting portion into and from the tubular connecting portion and an effect of preventing an electric shock can be achieved.

The columnar connecting portion of the first terminal can have an arbitrary shape as long as the maximum outer diameter thereof is smaller than that of the resin cap. For example, the cross-sectional shape of the columnar connecting portion can be an arbitrary shape such as an elliptical shape, a rectangular shape and other polygonal shapes besides a circular shape and the cross-sectional shape and size of the columnar connecting portion may be constant or possibly varying in a length direction.

The tubular connecting portion of the second terminal can have an arbitrary shape if the tubular connecting portion is resiliently deformable in the diameter expanding direction and shaped such that the columnar connecting portion of the first terminal can be press-fit from one end side in the axial direction and the resin cap projects to the other end side. For example, the tubular connecting portion can have an arbitrary shape such as a louver-type tubular connecting portion having an inner peripheral surface constituted by a plurality of resilient bent pieces arranged in a circumferential direction and a tubular connecting portion of such a type that plate members bent into a substantially semicircular shape are arranged to face each other and a contact pressure is applied by a separate spring member assembled from outside, and the cross-sectional shape and size of the tubular connecting portion may be constant or possibly varying in a length direction.

(2) Preferably, the tubular connecting portion includes a pair of inner protrusions arranged apart from each other in a circumferential direction of the inner peripheral surface of the tubular connecting portion, projecting radially inwardly of the tubular connecting portion and extending in an axial direction, and the second contact point is arranged between the pair of inner protrusions in the circumferential direction of the inner peripheral surface of the tubular connecting portion and projects radially inward with a projection height smaller than those of the pair of inner protrusions, and both axial end parts of the second contact point are located axially inward of both axial end parts of the pair of inner protrusions.

The pair of inner protrusions having a larger projection height than the second contact point are provided on both circumferential end parts of the second contact point on the inner peripheral surface of the tubular connecting portion, and the both axial end parts of the inner protrusions are located axially outward of the both end parts of the second contact point. In this way, before the second contact point comes into contact with the resin cap, the inner protrusions reliably come into contact with the resin cap and can expand the tubular connecting portion radially outwardly by such a distance that the second contact point does not come into contact with the resin cap. Further, since the engagement of the resin cap and the inner protrusions continues until the resin cap advances axially outward beyond the second contact point, sliding contact of the second contact point with the resin cap and the columnar connecting portion can be more reliably prevented or suppressed. As a result, further suppression of the scraping of plating can be realized.

Note that, more preferably, the pair of inner protrusions are provided over the entire length of the tubular connecting portion in the axial direction. In this way, the contact of the second contact point provided between the pair of inner protrusions and the resin cap and the sliding contact of the second contact point and the columnar connecting portion can be more reliably prevented.

(3) Preferably, the resin cap is shaped to have a varying radial dimension in a circumferential direction of the resin cap and includes a plurality of projecting contact portions provided at a plurality of positions separated from each other in the circumferential direction of the resin cap where the radial dimension is maximum, the plurality of projecting contact portions projecting radially outward further than the outer peripheral surface of the columnar connecting portion, and the projecting contact portions of the resin cap contact parts of the inner peripheral surface of the tubular connecting portion separated from the second contact point in a circumferential direction of the inner peripheral surface and the second contact point is separated from the resin cap in press-fitting the columnar connecting portion into the tubular connecting portion.

The resin cap has a hollow non-cylindrical shape having a varying radial dimension in the circumferential direction, and the plurality of projecting contact portions constituted by the parts where the radial dimension is maximum are provided at the positions separated from each other in the circumferential direction. The respective projecting contact portions projecting radially outward further than the outer peripheral surface of the columnar connecting portion contact the parts of the inner peripheral surface of the tubular connecting portion separated from the second contact point in the circumferential direction and expand the tubular connecting portion, whereby the first terminal can be press-fit into the second terminal. As a result, the sliding contact of the second contact point with the resin cap and the columnar connecting portion can be more reliably prevented or suppressed and further suppression of the scraping of plating can be realized.

Particularly, since the sliding contact of the second contact point with the resin cap and the columnar connecting portion can be prevented or suppressed only by providing the resin cap with the projecting contact portions projecting radially outward further than the outer peripheral surface of the columnar connecting portion and bringing the projecting contact portions into contact with the inner peripheral surface of the tubular connecting portion other than the second contact point, manufacturing cost can be reduced as compared to the case where the tubular connecting portion is provided with the projecting contact portions. Note that this mode may be adopted in combination with the inner protrusions in (2) described above.

(4) Preferably, the resin cap includes three projecting contact portions provided at three positions separated from each other in the circumferential direction of the resin cap, and any of parts of an outer peripheral surface of the resin cap connecting between the projecting contact portions adjacent in the circumferential direction of the resin cap is a flat surface. Since the resin cap includes the three projecting contact portions separated from each other in the circumferential direction, the second contact points can be provided at three positions separated in the circumferential direction in non-contact parts of the inner peripheral surface of the tubular connecting portion to be contacted by the respective projecting contact portions and the columnar connecting portion can be stably held among the second contact points. Further, since any of the parts of the outer peripheral surface of the resin cap connecting between the projecting contact portions adjacent in the circumferential direction is a flat surface, a separation distance between the second contact point arranged radially outwardly of the flat surface and the resin cap can be advantageously secured and the contact of the resin cap and the second contact point can be more advantageously suppressed or prevented.

(5) Preferably, an outer peripheral surface of the projecting contact portion is a flat surface extending in an axial direction of the resin cap while having a width. Since the outer peripheral surface of the projecting contact portion is formed by the flat surface extending in the axial direction while having a width, a surface pressure of the projecting contact portion to the inner peripheral surface of the tubular connecting portion can be reduced by an area of the flat surface. As a result, it is possible to reduce a possibility that the plating of the inner peripheral surface of the tubular connecting portion is peeled due to the sliding of the projecting contact portions on the inner peripheral surface of the tubular connecting portion.

(6) Preferably, the resin cap is positioned in the circumferential direction of the resin cap with respect to the columnar connecting portion by engaging an engaging portion provided in the resin cap with an engaged portion provided on the columnar connecting portion. The resin cap can be stably positioned on the columnar connecting portion by the engagement of the engaging portion and the engaged portion provided in and on the resin cap and the columnar connecting portion. As a result, it is possible to prevent a trouble in which the position of the projecting contact portion of the resin cap is shifted in the circumferential direction and contacts the second contact point.

(7) Preferably, the tubular connecting portion is configured to include a first peripheral wall portion and a second peripheral wall portion arranged to face each other, a resilient member is provided to bias the first and second peripheral wall portions in directions approaching each other, and the first and second peripheral wall portions are resiliently deformed in directions separating from each other against a biasing force of the resilient member and the tubular connecting portion is expanded in diameter and deformed by the resin cap with the resin cap located in the tubular connecting portion. The tubular connecting portion resiliently deformable in the diameter expanding direction can be easily manufactured by constituting the tubular connecting portion from a plurality of the peripheral wall portions and adopting the resilient member for biasing the plurality of these peripheral wall portions in the directions approaching each other. Particularly, the tubular connecting portion formed by arcuately curving a metal plate material having a certain plate thickness is especially advantageous when a high voltage is used.

(8) Preferably, a pair of inner protrusions arranged apart from each other in the circumferential direction and projecting radially inward and the second contact point arranged between the pair of inner protrusions, projecting radially inward with a projection height smaller than those of the pair of inner protrusions and located axially inward of both axial end parts of the pair of inner protrusions are provided on an inner peripheral surface of the first peripheral wall portion, a pair of linear contact portions projecting radially inward and linearly extending while extending in the axial direction of the tubular connecting portion are provided at two positions separated in the circumferential direction on an inner peripheral surface of the second peripheral wall portion, and the second contact point of the first peripheral wall portion is arranged between the pair of linear contact portions of the second peripheral wall portion in a projection in a facing direction of the first and second peripheral wall portions.

Since the second contact point provided on the first peripheral wall portion is suppressed from sliding against the resin cap and the columnar connecting portion by the inner protrusions, the wear of plating is suppressed. In addition, the pair of linear contact portions are arranged on both sides of the second contact point in the projection in the facing direction of the first and second peripheral wall portions on the inner peripheral surface of the second peripheral wall portion, and the second contact points of the second peripheral wall portion are constituted by these linear contact portions. As a result, in a state after the completion of the assembly of the both terminals where the resin cap is arranged to project from the tubular connecting portion toward the tip side in the press-fitting direction, the three second contact points (out of these, two linearly extending in the axial direction) separated from each other in the circumferential direction are pressed into contact with the first contact point constituted by the outer peripheral surface of the columnar connecting portion from both radially sides. In this way, a stably connected state of the first and second terminals is maintained.

(9) Preferably, the second contact point provided on the inner peripheral surface of the first peripheral wall portion is constituted by an arcuate protrusion arranged in a circumferential central part and projecting radially inward while extending in the circumferential direction, and a plurality of the second contact points are constituted by the arcuate protrusion and the respective linear contact portions provided on the inner peripheral surface of the second peripheral wall portion. The arcuate protrusion and the linear contact portions respectively projecting radially inward are provided on the inner peripheral surfaces of the both first and second peripheral wall portions, and the plurality of second contact points are constituted by these. Therefore, the columnar connecting portion can be supported at three points of the tubular connecting portion in the circumferential direction. In this way, the detachment of the columnar connecting portion from the tubular connecting portion can be prevented, for example, even if an external force is applied in a twisting direction to the first terminal.

(10) Preferably, a tip side reduced diameter surface gradually reduced in diameter toward a tip side in the press-fitting direction is provided on the tip side in the press-fitting direction of the resin cap, and an entrance side reduced diameter surface gradually reduced in diameter toward the tip side in the press-fitting direction is provided on an inner circumferential end part of the tubular connecting portion on an entrance side of the columnar connecting portion. The tip side reduced diameter surface and the entrance side reduced diameter surface respectively reduced in diameter toward the tip side in the press-fitting direction are provided on the tip side in the press-fitting direction of the resin cap and the inner circumferential end part of the tubular connecting portion on the entrance side of the columnar connecting portion. In this way, a sudden increase in insertion resistance in press-fitting the columnar connecting portion into the tubular connecting portion can be reduced. Further, the tip side reduced diameter surface and the entrance side reduced diameter surface come into contact with each other when the columnar connecting portion is press-fit into the tubular connecting portion, whereby a possibility of producing resin waste due to strong abrasion of the inner circumferential end part of the tubular connecting portion on the entrance side and the resin cap can be reduced. Note that the tip side reduced diameter surface and the entrance side reduced diameter surface may be, for example, tapered surfaces having a substantially constant taper angle or may be roundly chamfered curved surfaces.

(11) Preferably, a base end side reduced diameter surface gradually reduced in diameter toward a base end side in the press-fitting direction is provided on the base end side in the press-fitting direction of the resin cap, and an exit side reduced diameter surface gradually reduced in diameter toward the base end side in the press-fitting direction is provided on an inner circumferential end part of the tubular connecting portion on an exit side of the columnar connecting portion. The base end side reduced diameter surface and the exit side reduced diameter surface respectively reduced in diameter toward the base end side in the press-fitting direction are provided on the base end side in the press-fitting direction of the resin cap and the inner circumferential end part of the tubular connecting portion on the exit side of the columnar connecting portion. In this way, a sudden increase in pull-out resistance in pulling out the columnar connecting portion from the tubular connecting portion can be reduced. Further, the base end side reduced diameter surface and the exit side reduced diameter surface come into contact with each other when the columnar connecting portion is pulled out from the tubular connecting portion, whereby a possibility of producing resin waste due to strong abrasion of the inner circumferential end part of the tubular connecting portion on the exit side and the resin cap can be reduced. Note that the base end side reduced diameter surface and the exit side reduced diameter surface may be, for example, tapered surfaces having a substantially constant taper angle or may be roundly chamfered curved surfaces.

(12) The first terminal of the present disclosure is to be assembled with a second terminal including a tubular connecting portion resiliently deformable in a diameter expanding direction and provided with a columnar connecting portion to be press-fit into the tubular connecting portion, and a resin cap for covering a tip surface of the columnar connecting portion in a press-fitting direction into the tubular connecting portion, the resin cap having a maximum outer diameter larger than that of the columnar connecting portion, an outer peripheral surface of the columnar connecting portion constituting a first contact point to be pressed into contact with a second contact point provided on the tubular connecting portion, and the resin cap being arranged to project from the tubular connecting portion toward a tip side in the press-fitting direction at an assembly completed position of the columnar connecting portion with the tubular connecting portion.

According to the first terminal of this structure, the maximum outer diameter of the resin cap for covering the tip surface of the columnar connecting portion is larger than that of the columnar connecting portion. Thus, in press-fitting the columnar connecting portion of the first terminal into the tubular connecting portion of the second terminal, an inner diameter of the tubular connecting portion is first expanded to a dimension larger than the outer diameter of the columnar connecting portion by the resin cap. As a result, in fitting the first and second terminals, a part where a maximum surface pressure necessary for the expansion of the tubular connecting portion in the diameter expanding direction can be constituted by sliding surfaces by the outer surface (resin) of the resin cap of the first terminal and the inner surface (metal) of the tubular connecting portion of the second terminal. Thus, the scraping of the plating of the tubular connecting portion and the columnar connecting portion can be advantageously suppressed and the occurrence of troubles such as an increase in contact resistance can be suppressed as compared to a structure in which a maximum surface pressure is generated on sliding surfaces by the outer peripheral surface (metal) of the columnar connecting portion of the first terminal and the inner peripheral surface (metal) of the tubular connecting portion of the second terminal as before.

Further, at an assembly completed position of the columnar connecting portion with the tubular connecting portion, the resin cap is arranged to project from the tubular connecting portion toward the tip side in the press-fitting direction. As a result, the expansion of the tubular connecting portion by the resin cap is released and the outer peripheral surface (first contact point) of the columnar connecting portion is pressed into contact with the second contact point of the tubular connecting portion by a resilient restoring force of the tubular connecting portion. In this way, a state where the second contact point of the tubular connecting portion of the second terminal is pressed in contact with the first contact point of the columnar connecting portion of the first terminal can be stably maintained.

(13) Preferably, a tip side reduced diameter surface gradually reduced in diameter toward a tip side in the press-fitting direction is provided on the tip side in the press-fitting direction of the resin cap. Since the tip side reduced diameter surface gradually reduced in diameter toward the tip side is provided on the tip side in the press-fitting direction of the resin cap, a sudden increase in insertion resistance in press-fitting the columnar connecting portion into the tubular connecting portion can be reduced. Further, a possibility of producing resin waste due to strong abrasion of the inner circumferential end part of the tubular connecting portion on the entrance side and the resin cap can be reduced. Note that the tip side reduced diameter surface may be, for example, a tapered surface having a substantially constant taper angle or may be a roundly chamfered curved surface.

(14) Preferably, a base end side reduced diameter surface gradually reduced in diameter toward a base end side in the press-fitting direction is provided on the base end side in the press-fitting direction of the resin cap. Since the base end side reduced diameter surface gradually reduced in diameter toward the base end side is provided on the base end side in the press-fitting direction of the resin cap, a sudden increase in pull-out resistance in pulling out the columnar connecting portion from the tubular connecting portion can be reduced. Further, a possibility of producing resin waste due to strong abrasion of the inner circumferential end part of the tubular connecting portion on the exit side and the resin cap can be reduced. Note that the base end side reduced diameter surface may be, for example, a tapered surface having a substantially constant taper angle or may be a roundly chamfered curved surface.

(15) Preferably, the resin cap is shaped to have a varying radial dimension in a circumferential direction of the resin cap and includes a plurality of projecting contact portions provided at a plurality of positions separated from each other in the circumferential direction of the resin cap where the radial dimension is maximum, the plurality of projecting contact portions projecting radially outward further than the outer peripheral surface of the columnar connecting portion, and the projecting contact portions of the resin cap contact parts of the inner peripheral surface of the tubular connecting portion separated from the second contact point in a circumferential direction of the inner peripheral surface.

The resin cap has a hollow non-cylindrical shape having a varying radial dimension in the circumferential direction, and the plurality of projecting contact portions constituted by the parts where the radial dimension is maximum are provided at the positions separated from each other in the circumferential direction. The respective projecting contact portions projecting radially outward further than the outer peripheral surface of the columnar connecting portion contact the parts of the inner peripheral surface of the tubular connecting portion separated from the second contact point in the circumferential direction and expand the tubular connecting portion, whereby the first terminal can be press-fit into the second terminal. As a result, the sliding contact of the second contact point with the resin cap and the columnar connecting portion can be more reliably prevented or suppressed and further suppression of the scraping of plating can be realized.

(16) Preferably, the resin cap includes three projecting contact portions provided at three positions separated from each other in the circumferential direction of the resin cap, and any of parts of an outer peripheral surface of the resin cap connecting between the projecting contact portions adjacent in the circumferential direction of the resin cap is a flat surface. Since the resin cap includes the three projecting contact portions separated from each other in the circumferential direction, the second contact points can be provided at three positions separated in the circumferential direction in non-contact parts of the inner peripheral surface of the tubular connecting portion to be contacted by the respective projecting contact portions and the columnar connecting portion can be stably held among the second contact points. Further, since any of the parts of the outer peripheral surface of the resin cap connecting between the projecting contact portions adjacent in the circumferential direction is a flat surface, a separation distance between the second contact point arranged radially outwardly of the flat surface and the resin cap can be advantageously secured and the contact of the resin cap and the second contact point can be more advantageously suppressed or prevented.

(17) Preferably, an outer peripheral surface of the projecting contact portion is a flat surface extending in an axial direction of the resin cap while having a width. Since the outer peripheral surface of the projecting contact portion is formed by the flat surface extending in the axial direction while having a width, a surface pressure of the projecting contact portion to the inner peripheral surface of the tubular connecting portion can be reduced by an area of the flat surface. As a result, it is possible to reduce a possibility that the plating of the inner peripheral surface of the tubular connecting portion is peeled due to the sliding of the projecting contact portions on the inner peripheral surface of the tubular connecting portion.

(18) Preferably, the resin cap is positioned in the circumferential direction of the resin cap with respect to the columnar connecting portion by engaging an engaging portion provided in the resin cap with an engaged portion provided on the columnar connecting portion. The resin cap can be stably positioned on the columnar connecting portion by the engagement of the engaging portion and the engaged portion provided in and on the resin cap and the columnar connecting portion. As a result, it is possible to prevent a trouble in which the position of the projecting contact portion of the resin cap is shifted in the circumferential direction and contacts the second contact point.

Details of Embodiments of Present Disclosure

Specific examples of a terminal unit and a first terminal of the present disclosure are described below with reference to the drawings. Note that the present disclosure is not limited to these illustrations, but is represented by claims and intended to include all changes in the scope of claims and in the meaning and scope of equivalents.

First Embodiment

Figure 3:
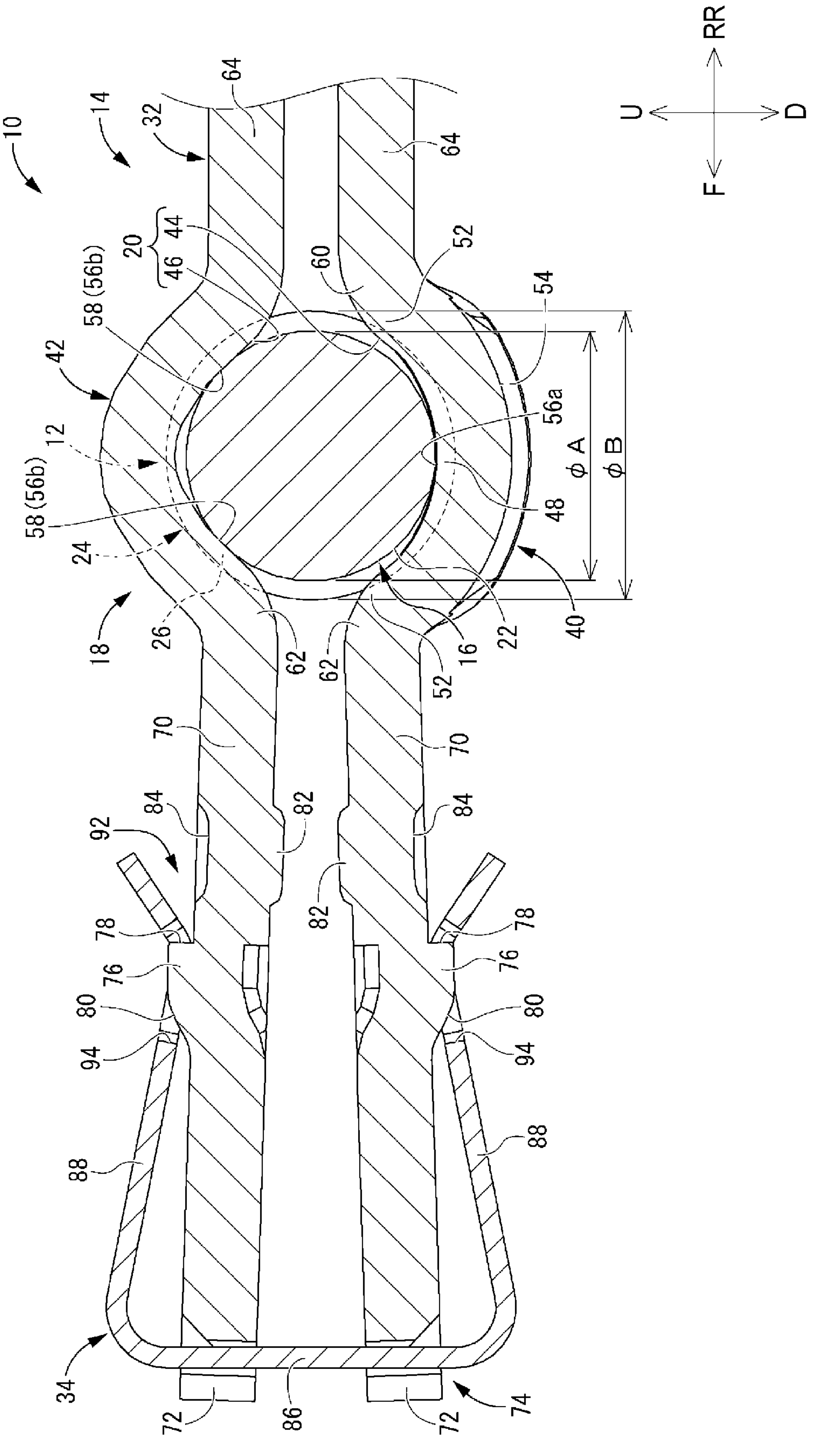
FIG. 3 is a section along III-III in FIG. 1.

Hereinafter, a terminal unit 10 of a first embodiment of the present disclosure and a first terminal 12 and a second terminal 14 constituting the terminal unit 10 are described using FIGS. 1 to 9. The first terminal 12 includes a columnar connecting portion 16, and the second terminal 14 includes a tubular connecting portion 18 resiliently deformable in a diameter expanding direction. The columnar connecting portion 16 and the tubular connecting portion 18 are assembled by press-fitting the columnar connecting portion 16 of the first terminal 12 into the tubular connecting portion 18 of the second terminal 14. The first and second terminals 12, 14 are conductively connected by bringing the outer peripheral surface of the columnar connecting portion 16 and an inner peripheral surface 20 of the tubular connecting portion 18 into contact with each other. That is, in the first embodiment, the first terminal 12 is a male terminal and a second terminal 14 is a female terminal. Further, a first contact point 22 is constituted by the outer peripheral surface of the first terminal 12, and second contact points **56*a*, 56*b* to be described later are provided on the inner peripheral surface 20 of the tubular connecting portion 18. In the following description, left and right sides in FIG. 3 are referred to as front and rear sides. Upper and lower sides in FIG. 3 are referred to as upper and lower sides. Left and right sides in FIG. 4** are referred to as left and right sides. Further, for a plurality of identical members, only some members may be denoted by a reference sign and the other members may not be denoted by the reference sign.

<First Terminal 12>

The first terminal 12 includes the columnar connecting portion 16 having a maximum outer diameter ϕA (see FIGS. 3 and 4) on a tip. In the first embodiment, the columnar connecting portion 16 has a substantially true circular cross-sectional shape, and the outer diameter is substantially constant at ϕA in an axial direction. The first terminal 12 includes a resin cap 24 for covering the tip surface of the columnar connecting portion 16 in a press-fitting direction (direction from right to left as described later) into the tubular connecting portion 18. That is, the columnar connecting portion 16 is press-fit into the tubular connecting portion 18 with the resin cap 24 in the lead. Note that, in the first terminal 12, the shape of a side closer to a base end than the columnar connecting portion 16 is not limited, and an end part of the first terminal 12 on a side opposite to the columnar connecting portion 16 may be, for example, fixed to a terminal portion of a device by a bolt or the like or fixed to a wire.

<Resin Cap 24>

The resin cap 24 is formed of synthetic resin and has electrically insulating property. In the first embodiment, the resilient member 24 has a substantially true circular cross-sectional shape. An outer diameter of the resin cap 24 varies in the axial direction (an extension direction of the columnar connecting portion 16 and a lateral direction), and a large-diameter portion 26 having a largest outer diameter is provided in an axially intermediate part. An maximum outer diameter (outer diameter in the large-diameter portion 26) ϕB (see FIGS. 3 and 4) of the resin cap 24 is larger than the outer diameter ϕA of the columnar connecting portion 16. In the first embodiment, the maximum outer diameter ϕB of the resin cap 24 is larger than the outer diameter ϕA of the columnar connecting portion 16 over an entire circumference in a circumferential direction.

Since the resin cap 24 includes the large-diameter portion 26 having the largest outer diameter in the axially intermediate part, parts adjacent to the large-diameter portion 26 in the axial direction are gradually reduced in outer diameter from the large-diameter portion 26. That is, on the outer peripheral surface of the resin cap 24, a part adjacent to the large-diameter portion 26 on a tip side (left side) in the press-fitting direction of the columnar connecting portion 16 is provided with a tip side reduced diameter surface 28 gradually reduced in diameter toward the tip side in the press-fitting direction. Further, on the outer peripheral surface of the resin cap 24, a part adjacent to the large-diameter portion 26 on a base end side (right side) in the press-fitting direction of the columnar connecting portion 16 is provided with a base end side reduced diameter surface 30 gradually reduced in diameter toward the base end side in the press-fitting direction. In the first embodiment, the tip side reduced diameter surface 28 is a chamfered curved surface, and the base end side reduced diameter surface 30 is a tapered surface having a substantially constant taper angle.

Such a resin cap 24 may be formed separately from the columnar connecting portion 16 and assembled with the tip of the columnar connecting portion 16 by crimping or the like, or may be integrally formed to the columnar connecting portion 16. Note that the resin cap 24 may be used as a finger contact preventing cap for preventing the contact of worker's fingers, a tool or the like with the first terminal 12, for example, when the terminal unit 10 is applied as a high-voltage terminal unit of an electric vehicle or the like, or may have both a function of expansively deforming the tubular connecting portion 18 to be described later and an electric shock preventing function.

<Second Terminal 14>

The second terminal 14 is configured by assembling a clip spring 34 serving as a resilient member with a terminal fitting 32. The terminal fitting 32 is formed by press-working a metal flat plate substantially strip-like as a whole into a predetermined shape. Copper, copper alloy, aluminum, aluminum alloy and the like low in electrical resistance can be adopted as a metal for constituting the metal flat plate. The terminal fitting 32 includes the aforementioned tubular connecting portion 18.

<Tubular Connecting Portion 18>

The tubular connecting portion 18 has a substantially hollow cylindrical shape as a whole and is open on both sides in the lateral direction. That is, an axial direction of the tubular connecting portion 18 is the lateral direction. Note that, in FIG. 7 to be described later and showing a longitudinal cross-section of the second terminal 14 before the first terminal 12 is press-fit, a diameter ϕC of a virtual circle (shown by a two-dot chain line in FIG. 7) passing through an arcuate protrusion 48 and each linear contact portion 58 constituting the second contact points 56 is smaller than the outer diameter ϕA of the columnar connecting portion 16.

<Entrance-Side Reduced Diameter Surface 36 and Exit-Side Reduced Diameter Surface 38>

As described later, the press-fitting direction of the columnar connecting portion 16 into the tubular connecting portion 18 is a direction from right to left. That is, in the tubular connecting portion 18, a right side is an entrance side of the columnar connecting portion 16 and a left side is an exit side of the columnar connecting portion 16. In the tubular connecting portion 18, an entrance side reduced diameter surface 36 gradually reduced in diameter toward a tip side in the press-fitting direction of the columnar connecting portion 16 is provided on an inner circumferential end part on the entrance side of the columnar connecting portion 16. Further, an exit side reduced diameter surface 38 gradually reduced in diameter toward a base end side in the press-fitting direction of the columnar connecting portion 16 is provided on an inner circumferential end part on the exit side of the columnar connecting portion 16. In the first embodiment, each of these entrance side reduced diameter surface 36 and exit side reduced diameter surface 38 is formed as a tapered surface having a substantially constant taper angle. These entrance side reduced diameter surface 36 and exit side reduced diameter surface 38 are formed substantially over the entire circumference of the tubular connecting portion 18 in a circumferential direction. In the first embodiment, the tubular connecting portion 18 is divided into a first peripheral wall portion 40 and a second peripheral wall portion 42 facing each other in a vertical direction as described later. Therefore, the tapered surface constituting the entrance side reduced diameter surface 36 and the tapered surface constituting the exit side reduced diameter surface 38 are respectively divided on the first and second peripheral wall portions 40, 42.

<First Peripheral Wall Portion 40 and Second Peripheral Wall Portion 42>

The tubular connecting portion 18 is configured to include the first and second peripheral wall portions 40, 42 arranged to face each other in the vertical direction. In the first embodiment, the first peripheral wall portion 40 is located on a lower side, and the second peripheral wall portion 42 is located on an upper side. Each of the first and second peripheral wall portions 40, 42 is a substantially halved tubular body and has an inner peripheral surface 44, 46 having an arcuate cross-sectional shape in the longitudinal cross-section of the second terminal 14 shown in FIG. 3 and the like. Therefore, the inner peripheral surface 20 of the tubular connecting portion 18 is constituted by the both inner peripheral surfaces 44, 46 of the first and second peripheral wall portions 40, 42. As also shown in FIG. 3, in press-fitting the columnar connecting portion 16 of the first terminal 12 into the tubular connecting portion 18 of the second terminal 14, the first contact point 22 constituted by the outer peripheral surface of the columnar connecting portion 16 and the later-described second contact points **56*a*, 56*b* and 56*b* provided on the inner peripheral surface 20 (both inner peripheral surfaces 44, 46) of the tubular connecting portion 18** contact each other.

Figure 4:
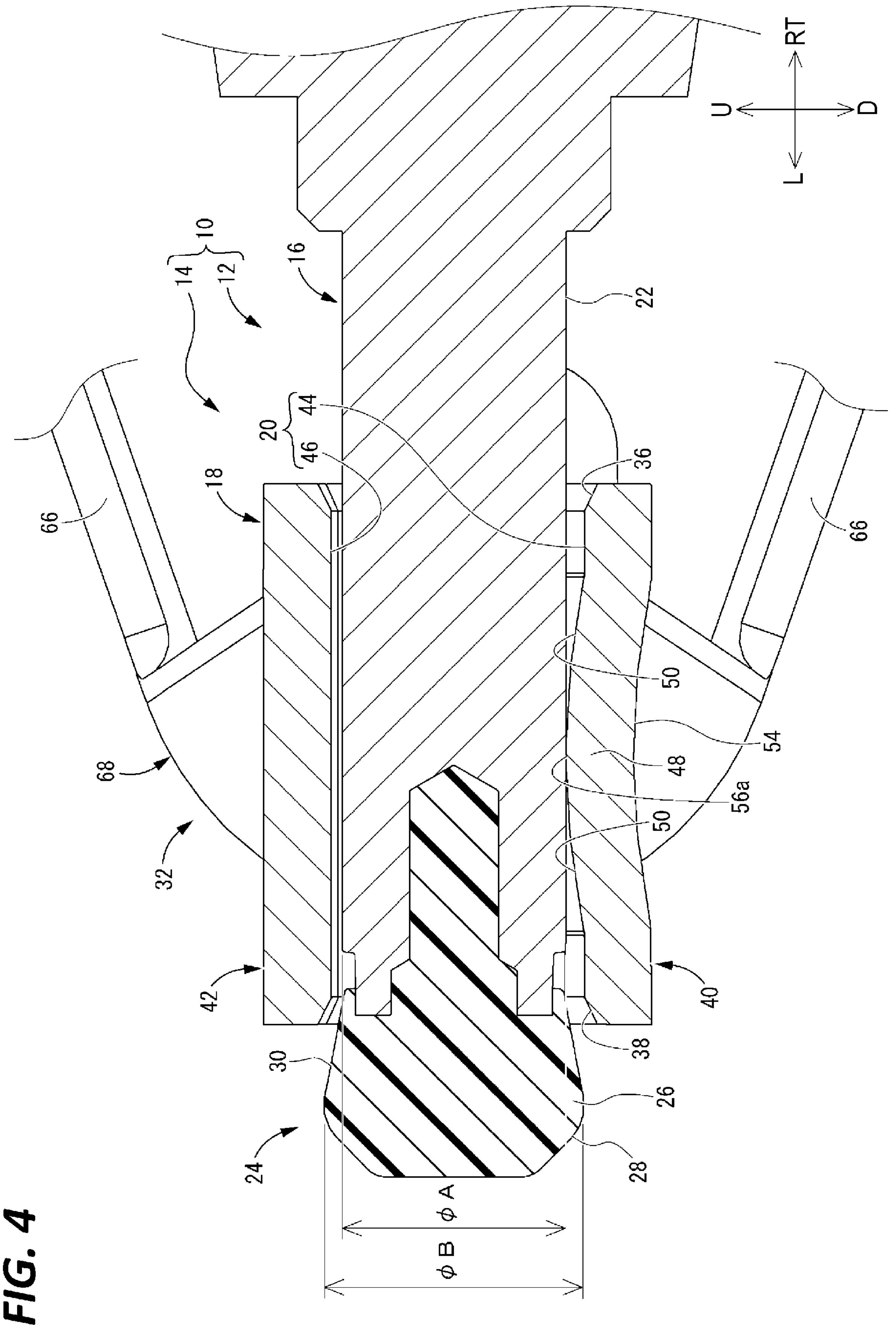
FIG. 4 is a section along IV-IV in FIG. 1.
Figure 5:
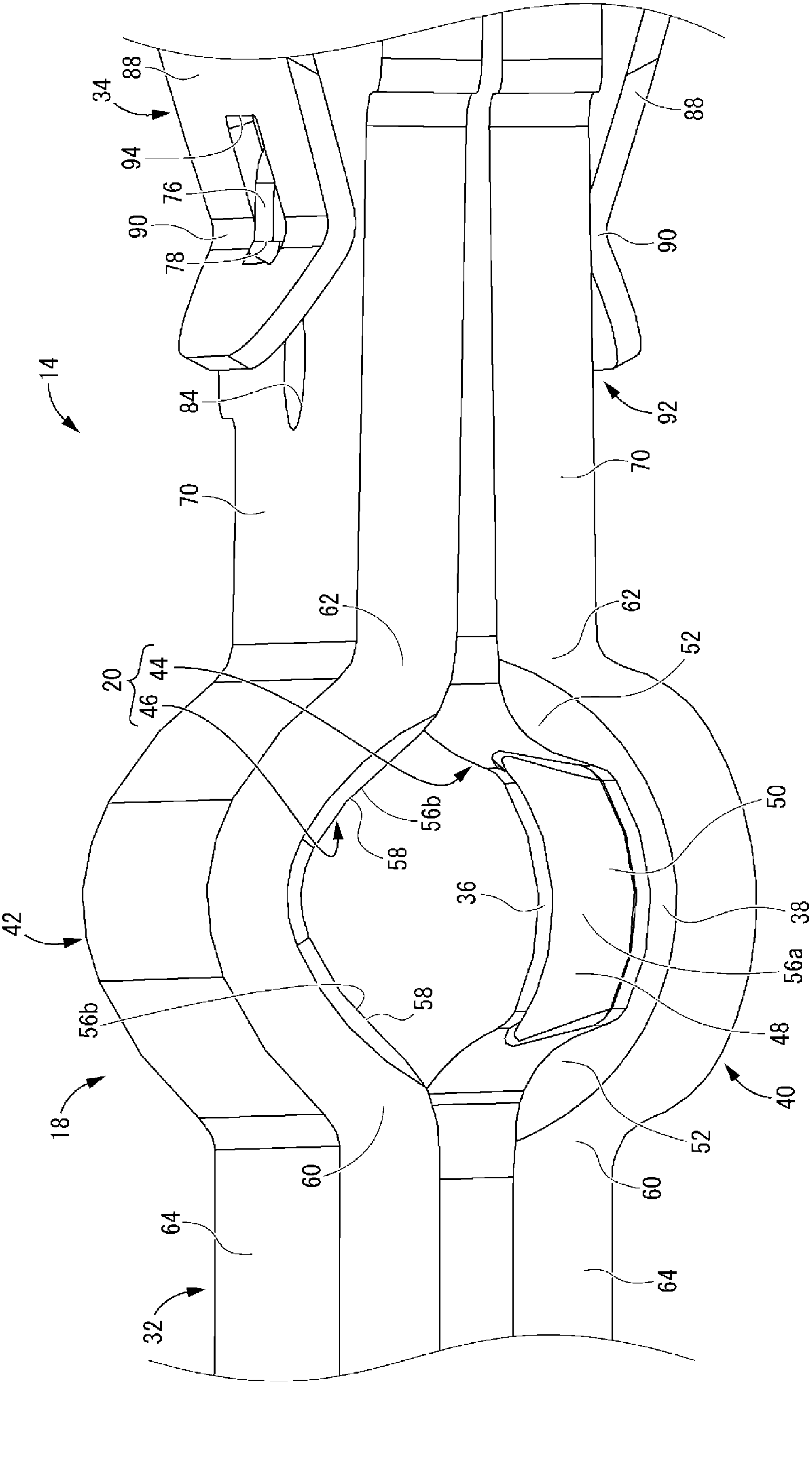
FIG. 5 is a perspective view enlargedly showing an essential part of a second terminal constituting the terminal unit shown in FIG. 1.

As also shown in FIGS. 3 to 5, the arcuate protrusion 48 projecting radially inward while extending in the circumferential direction is provided on a circumferential central part of the inner peripheral surface 44 of the first peripheral wall portion 40. This arcuate protrusion 48 is provided in a lateral central part of the first peripheral wall portion 40 such that a lateral center projects most radially inward. The arcuate protrusion 48 has a predetermined axial dimension (lateral dimension), which is smaller than the entire lateral length of the first peripheral wall portion 40. Further, as also shown in FIG. 4, both sides in the lateral direction across the most radially projecting lateral center on the inner surface of the arcuate protrusion 48 are curved surfaces 50, 50 having a projection dimension gradually reduced toward an outer side in the lateral direction.

Inner protrusions 52 projecting radially inward are provided on both circumferential side parts across the arcuate protrusion 48 on the inner peripheral surface 44 of the first peripheral wall portion 40. Each of these inner protrusions 52 is provided substantially over the entire length of the first peripheral wall portion 40 in the lateral direction. That is, a pair of the inner protrusions 52, 52 are arranged apart from each other in the circumferential direction on the inner peripheral surface 44 of the first peripheral wall portion 40, project radially inwardly of the tubular connecting portion 18 and extend in the axial direction. Further, both axial end parts of the arcuate protrusion 48 are located more axially inward than both axial end parts of each inner protrusion 52. In the first embodiment, each inner protrusion 52 projects radially inward more than a most radially inwardly projecting part (lateral center) of the arcuate protrusion 48.

Further, in the first embodiment, the arcuate protrusion 48 and the respective inner protrusions 52 are formed by press-working the first peripheral wall portion 40. In this way, a recess 54 open outward (downward) is formed at a position corresponding to the arcuate protrusion 48 and the respective inner protrusions 52 on the outer peripheral surface of the first peripheral wall portion 40. Particularly, in the first embodiment, the recess for forming the arcuate protrusion 48 and the recesses for forming the respective inner protrusions 52 are connected in a front-rear direction, and one recess 54 is formed to extend in the front-rear direction.

A curvature of the inner surface of the arcuate protrusion 48 is smaller than that of the outer peripheral surface (first contact point 22) of the columnar connecting portion 16. In this way, when the first and second terminals 12, 14 are fit as shown in FIG. 3 and the like, a circumferential center of the arcuate protrusion 48 contacts the outer peripheral surface (first contact point 22) of the columnar connecting portion 16. That is, the second contact point 56*a* contacting the first contact point 22 when the first and second terminals 12, 14 are fit is constituted particularly by a top part of a circumferential center on the inner surface of the arcuate protrusion 48. This second contact point 56*a* (arcuate protrusion 48) is arranged between the pair of inner protrusions 52, 52 in the circumferential direction on the inner peripheral surface 44 of the first peripheral wall portion 40 and projects radially inward with a projection height smaller than those of the pair of inner protrusions 52, 52. Note that although the respective inner protrusions 52 provided on the both circumferential side parts of the arcuate protrusion 48 project radially inward more than the arcuate protrusion 48, the inner surfaces of the respective inner protrusions 52 and the outer peripheral surface (first contact point 22) of the columnar connecting portion 16 do not contact each other when the first and second terminals 12, 14 are fit.

In the longitudinal cross-section of the second terminal 14 shown in FIG. 3 and the like, a curvature of the inner peripheral surface 46 of the second peripheral wall portion 42 partially varies in the circumferential direction in the first embodiment. Specifically, on the inner peripheral surface 46, parts having a smaller curvature than a circumferential central part are provided at two positions separated on sides closer to both circumferential ends than the circumferential central part. In this way, in the longitudinal cross-section of the second terminal 14 shown in FIG. 3 and the like, the circumferential central part of the inner peripheral surface 46 has an arc shape having a substantially constant curvature and substantially linearly extending parts are connected to both circumferential ends of that arc. In short, two parts separated on the sides closer to the both circumferential ends than the circumferential central part project more radially inward as compared to the case where the inner peripheral surface 46 is a curved surface having a substantially constant curvature.

In the first embodiment, the second peripheral wall portion 42 has substantially constant inner and outer surface shapes and extends in the lateral direction, which is the axial direction of the tubular connecting portion 18. Thus, as described later, when the columnar connecting portion 16 is press-fit into the tubular connecting portion 18, the large-diameter portion 26 of the resin cap 24 contacts the inner peripheral surface 46 of the second peripheral wall portion 42 at two positions separated on the sides closer to the both circumferential ends than the circumferential central part of the inner peripheral surface 46. Further, when the press-fitting of the columnar connecting portion 16 into the tubular connecting portion 18 is completed, the inner peripheral surface of the second peripheral wall portion 42 and the outer peripheral surface (first contact point 22) of the columnar connecting portion 16 are in contact at the two positions separated on the sides closer to the both circumferential ends than the circumferential central part of the inner peripheral surface 46. The second peripheral wall portion 42 is held in line contact with these resin cap 24 and columnar connecting portion 16 at the two positions separated on the sides closer to the both circumferential ends than the circumferential central part. In the first embodiment, in the second peripheral wall portion 42, parts radially projecting inward by reducing the curvature of the inner peripheral surface 46 and to be contacted by the resin cap 24 and the columnar connecting portion 16 are linear contact portions 58.

That is, the linear contact portions 58 projecting radially inward while extending in the axial direction of the tubular connecting portion 18 are provided at a plurality of positions (two positions) separated in the circumferential direction on the inner peripheral surface 46 of the second peripheral wall portion 42. In addition to the second contact point 56*a* of the aforementioned arcuate protrusion 48, a pair of the second contact points 56*b*, 56*b* to be contacted by the first contact point 22 when the first and second terminals 12, 14 are fit are constituted by top parts of these respective linear contact portions 58. Each second contact point 56*b* (each linear contact portion 58) on the side of the second peripheral wall portion 42 linearly extends in the lateral direction. Particularly, in the first embodiment, the second contact point on the side of the first peripheral wall portion 40 (circumferential center of the arcuate protrusion 48) is arranged between the second contact points (pair of the linear contact portions 58, 58) on the side of the second peripheral wall portion 42 in the front-rear direction in a projection in a facing direction of the first and second peripheral wall portions 40, 42 (when viewed from the vertical direction).

<Terminal Fitting 32>

In the terminal fitting 32, rear end parts of the first and second peripheral wall portions 40, 42 are circumferential end parts facing each other in the vertical direction and serve as first circumferential end parts 60, 60. This pair of first circumferential end parts 60, 60 are facing each other while being separated by a predetermined separation distance in the vertical direction. Further, front end parts of the first and second peripheral wall portions 40, 42 are circumferential end parts facing each other in the vertical direction and serve as second circumferential end parts 62, 62. This pair of second circumferential end parts 62, 62 are facing each other while being separated by a predetermined separation distance in the vertical direction.

The pair of first circumferential end parts 60, 60 are respectively provided with a pair of base end side plate portions 64, 64 projecting radially outwardly (rearwardly) of the tubular connecting portion 18. As described above, the terminal fitting 32 is formed by press-working the substantially strip-like metal flat plate, and the pair of base end side plate portions 64, 64 are coupled to each other in rear parts thereof. In the first embodiment, the pair of base end side plate portions 64, 64 respectively have a substantially rectangular shape when viewed from the vertical direction.

A wire crimping portion 68 to be crimped to an unillustrated wire by crimping pieces 66 is provided behind the base end side plate portions 64, 64. The wire crimped by the wire crimping portion 68 is, for example, a coated wire, and a core wire exposed by stripping an insulation coating in an end part of the wire is crimped by the crimping pieces 66 in the wire crimping portion 68 provided in a rear end part of the second terminal 14 (terminal fitting 32). Note that a method for fixing the core wire of the wire to the second terminal 14 (terminal fitting 32) is not limited to crimping, and may be, for example, welding, fusing or the like. Note that the second terminal 14 may be fixed to a terminal portion of a device by a bolt or the like instead of the wire.

The pair of second circumferential end parts 62, 62 are respectively provided with a pair of tip side plate portions 70, 70 projecting radially outwardly (forwardly) of the tubular connecting portion 18. The pair of tip side plate portions 70, 70 have a substantially rectangular shape when viewed from the vertical direction and are separated from each other in the vertical direction. That is, in the second terminal 14, the base end side plate portions 64, 64 are coupled to each other on one side (rear side) in the front-rear direction with respect to the first and second peripheral wall portions 40, 42, and the tip side plate portions 70, 70 are separated from each other and in the form of cantilevers to constitute free ends on the other side (front side) in the front-rear direction with respect to the first and second peripheral wall portions 40, 42. As a result, the tip side plate portions 70, 70 are resiliently deformable in directions toward or away from each other. Positioning protrusions 72, 72 projecting forward are provided on both lateral sides in a front end part of each of the tip side plate portions 70, 70. In other words, lateral intermediate parts are located behind the positioning protrusions 72, 72 in the front end parts of the tip side plate portions 70, 70. A clip spring mounting portion 74, on which the clip spring 34 is mounted, is constituted by the lateral intermediate parts in the front end parts of the tip side plate portions 70, 70.

Protrusions 76, 76 projecting vertically outward are provided in widthwise central parts on the vertically outer surfaces of the tip side plate portions 70, 70. Each protrusion 76 has a triangular or trapezoidal shape when viewed from the lateral direction. That is, the rear surface of each protrusion 76 is a vertical surface 78 extending substantially in the vertical direction and the front surface of each protrusion 76 is an inclined surface 80 inclined to reduce a vertically outward projection height toward a front side.

Stoppers 82, 82 projecting vertically inward are provided in widthwise central parts of the vertically inner surfaces of the tip side plate portions 70, 70. Each stopper 82 has a flat and substantially cylindrical shape having a projection height (vertical dimension) smaller than an outer diameter. These stoppers 82 are preferably provided at positions closer to the tubular connecting portion 18 than the tips of the tip side plate portions 70. In the first embodiment, each stopper 82 is provided behind (closer to the tubular connecting portion 18 than) the protrusion 76 provided on the outer surface of the tip side plate portion 70. Each stopper 82 is formed by press-working each tip side plate portion 70, and a recess 84 open outward in the vertical direction is formed at a position corresponding to the stopper 82 in the outer surface of each tip side plate portion 70.

<Clip Spring 34>

The clip spring 34 serving as the resilient member for biasing the tip side plate portions 70, 70 in directions approaching each other and applying biasing forces to the first and second peripheral wall portions 40, 42 coupled behind the tip side plate portions 70, 70 in the directions approaching each other is mounted on front end parts of the tip side plate portions 70, 70. That is, by applying external forces to the first and second peripheral wall portions 40, 42 against the biasing forces of the clip spring 34, the first and second peripheral wall portions 40, 42 are displaced in directions separating from each other and the tubular connecting portion 18 is resiliently deformed in the diameter expanding direction. The clip spring 34 is formed using various metal materials, which can be press-worked or stamped, such as strip plates of spring steel, stainless steel, brass, phosphor bronze and beryllium copper. Note that, in the first embodiment, a gap between the tip side plate portions 70, 70 in a facing direction is set to gradually increase toward a front end side, i.e. in a direction separating from the second circumferential end parts 62, 62. In this way, the biasing forces applied to the first and second peripheral wall portions 40, 42 in the approaching directions are increased when the clip spring 34 is mounted.

The clip spring 34 includes a coupling plate 86 having a substantially rectangular shape when viewed from the front-rear direction and a pair of pressing pieces 88, 88 projecting toward one side (right side in FIG. 3) in a plate thickness direction of the coupling plate 86 from both end parts of the coupling plate 86 and inclined in directions approaching each other. Bent portions 90 are provided in lengthwise intermediate parts of the respective pressing pieces 88, and projecting end parts of the respective pressing pieces 88 extend from the respective bent portions 90 in directions separating from each other. Therefore, a facing distance between the respective pressing pieces 88 is shortest at the bent portions 90 provided in the lengthwise intermediate parts, and a gap between these bent portions 90, 90 is an insertion opening 92, through which the terminal fitting 32 is inserted into the clip spring 34. An opening dimension (vertical dimension) of the insertion opening 92 of the clip spring 34 in a single state before being mounted on the terminal fitting 32 is smaller than a vertical dimension in the tip of the terminal fitting 32 in a single state shown in FIG. 6. Further, a substantially rectangular locking recess 94 penetrating through the pressing piece 88 in a plate thickness direction is formed in a widthwise center of each of the bent portions 90, 90 of the pair of pressing pieces 88, 88.

<Assembly of Terminal Fitting 32 and Clip Spring 34>

Figure 6:
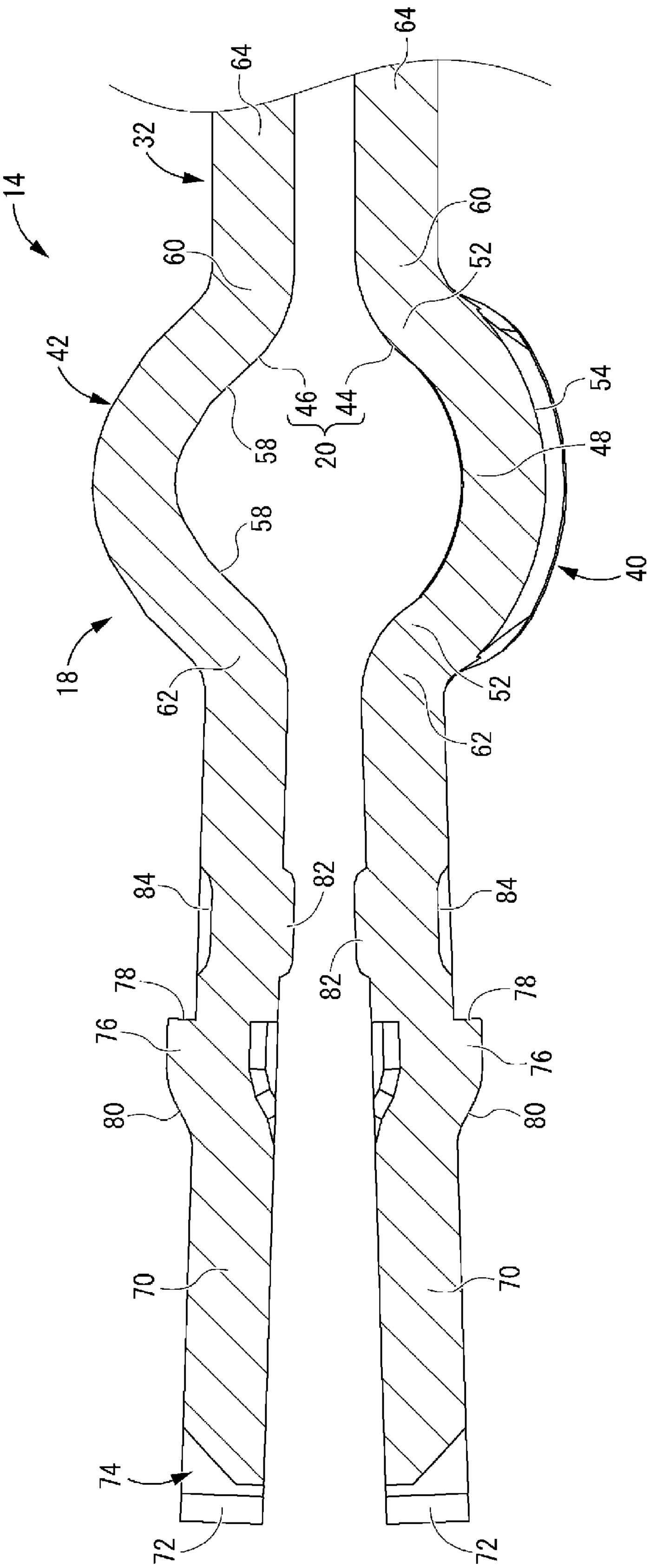
FIG. 6 is a longitudinal section, corresponding to FIG. 3, showing the second terminal before a resilient member is mounted.

The clip spring 34 shaped as described above is assembled with the pair of tip side plate portions 70, 70 of the terminal fitting 32 in the single state shown in FIG. 6 from front. That is, the tip side plate portions 70, 70 in the terminal fitting 32 are inserted into the insertion opening 92 in the clip spring 34, and the clip spring 34 is slid and displaced rearward with respect to the terminal fitting 32. In this way, the tip side plate portions 70, 70 of the terminal fitting 32 are sandwiched from outer sides in the vertical direction by the pair of pressing pieces 88, 88 in the clip spring 34. Then, the respective protrusions 76 projecting outward in the vertical direction from the tip side plate portions 70, 70 are locked into the respective locking recesses 94 in the clip spring 34. In this way, the clip spring 34 is assembled with the pair of tip side plate portions 70, 70 with tip parts (front end parts) of the pair of tip side plate portions 70, 70 sandwiched between the pair of pressing pieces 88, 88. As a result, the second terminal 14 is completed as shown in FIG. 7.

Here, as described above, the opening dimension (vertical dimension) of the insertion opening 92 in the clip spring 34 is smaller than the vertical dimension in the tip (tip side plate portions 70, 70) of the terminal fitting 32 in the single state shown in FIG. 6. Therefore, by inserting the front end parts of the tip side plate portions 70, 70 into the insertion opening 92 of the clip spring 34, the tip side plate portions 70, 70 push and expand the insertion opening 92 of the terminal fitting 32 outward in the vertical direction and the pressing pieces 88, 88 are resiliently deformed in the directions separating from each other. In this way, the front end parts of the tip side plate portions 70, 70 can be inserted into the insertion opening 92 of the clip spring 34, and the clip spring 34 is assembled with the front end parts of the tip side plate portions 70, 70. Then, resilient restoring forces of these pressing pieces 88, 88 are applied to the front end parts of the tip side plate portions 70, 70 as biasing forces in the directions approaching each other.

Further, by applying the biasing forces to the tip side plate portions 70, 70 in the directions approaching each other, the second circumferential end parts 62, 62 in the first and second peripheral wall portions 40, 42 coupled behind the tip side plate portions 70, 70 are biased in directions approaching each other. In this way, an inner diameter of the tubular connecting portion 18 is made smaller in the mounted state of the clip spring 34 shown in FIG. 7 than in the state shown in FIG. 6 before the clip spring 34 is mounted. Specifically, as described above, the diameter ϕC of the virtual circle passing through the arcuate protrusion 48 and each linear contact portion 58 is made smaller than the outer diameter ϕA of the columnar connecting portion 16.

Figure 7:
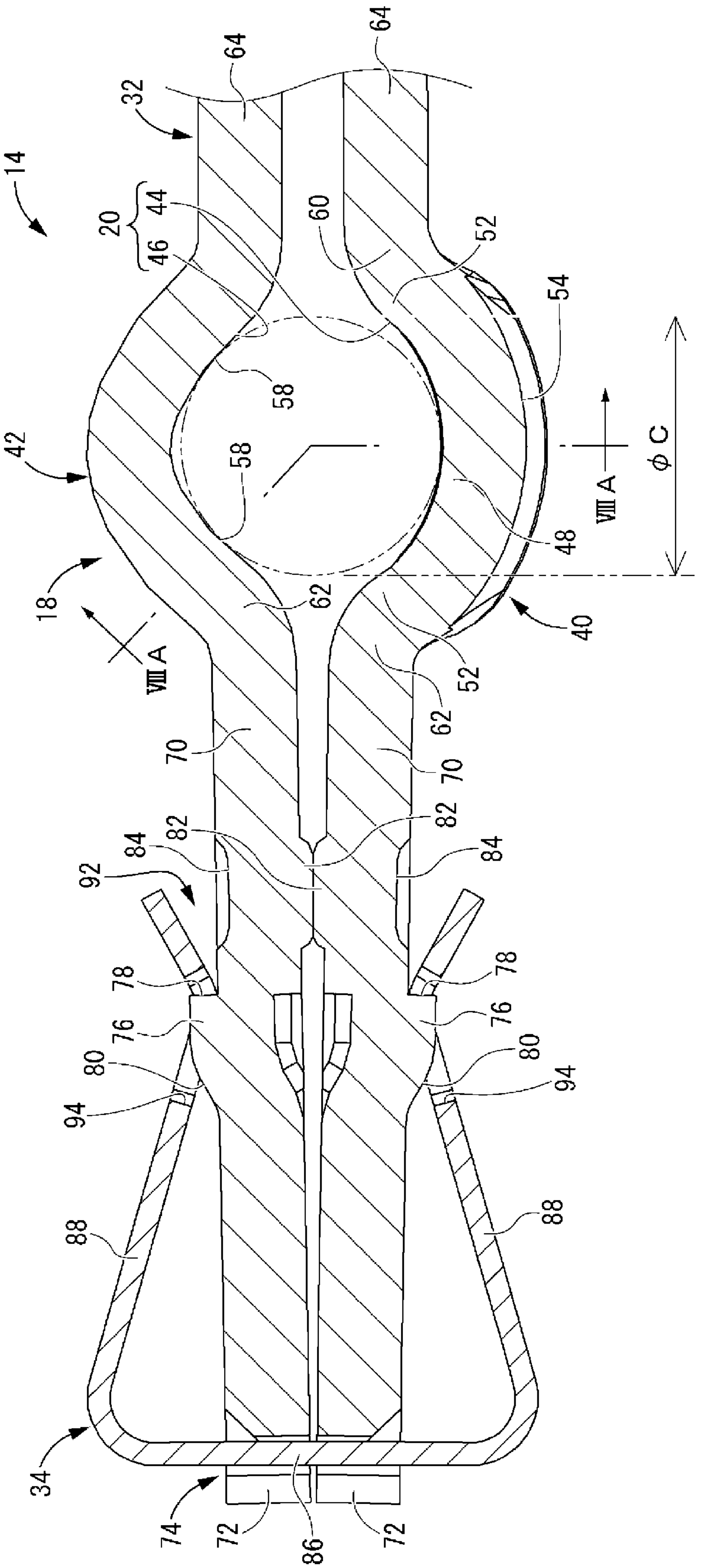
FIG. 7 is a longitudinal section, corresponding to FIG. 3, showing the second terminal before a first terminal is press-fit.

In the first embodiment, the stoppers 82, 82 projecting inward in the facing direction are provided in the lengthwise intermediate parts of the respective tip side plate portions 70, and come into contact with each other when the clip spring 34 is mounted as shown in FIG. 7. In this way, the tips of the tip side plate portions 70, 70 are separated from each other without coming into contact with each other when the clip spring 34 is mounted. As a result, a gripping force by the clip spring 34 is suppressed from being reduced as the tips of the tip side plate portions 70, 70 come into contact with each other, and is stably applied to the stoppers 82 and the tubular connecting portion 18 (first and second peripheral wall portions 40, 42) provided relatively near the stoppers 82. In this way, a force for holding the columnar connecting portion 16 by the tubular connecting portion 18 is improved.

Further, it is suppressed by the contact of the both stoppers 82, 82 that the inner diameter of the tubular connecting portion 18 (diameter ϕC of the virtual circle passing through the inner surfaces of the tubular connecting portion 18 and each linear contact portion 58) becomes excessively small. In this way, an increase in insertion resistance is suppressed when the columnar connecting portion 16 is press-fit into the tubular connecting portion 18.

<Assembly of Terminal Unit 10>

Figure 8A:
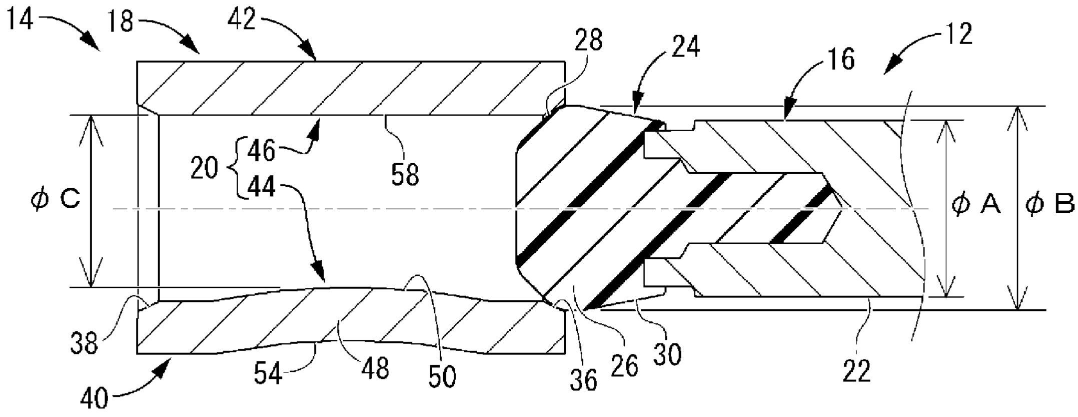
FIG. 8A is a diagram showing a model of a state when the first terminal is press-fit into the second terminal, wherein a state where the press-fitting of the first terminal into the second terminal is started is shown by a cross-section along VIIIA-VIIIA in FIG. 7.
Figure 8B:
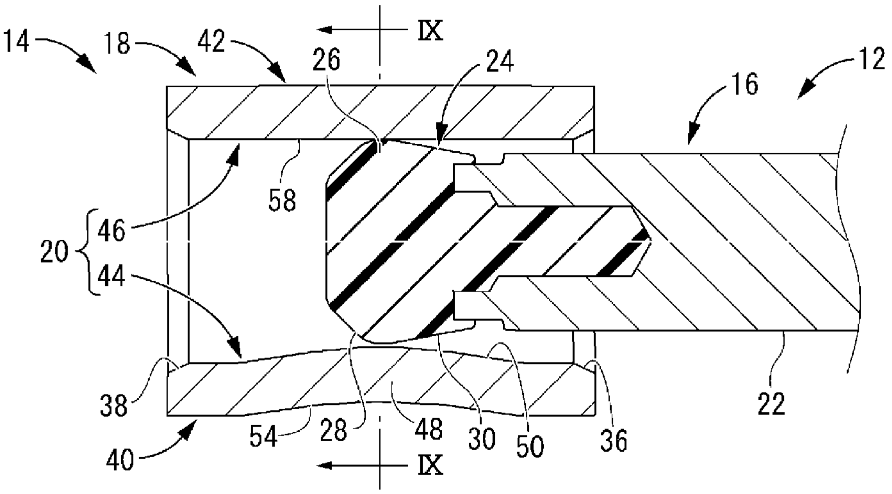
FIG. 8B is a diagram showing a state where the first terminal is further press-fit into the second terminal from the state of FIG. 8A, wherein a state where a resin cap is located in a tubular connecting portion is shown by a cross-section along VIIIB-VIIIB in FIG. 9.
Figure 8C:
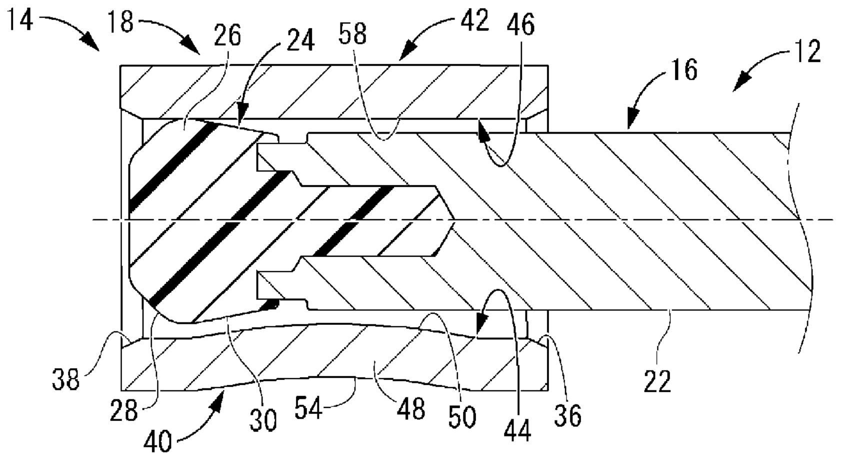
FIG. 8C is a diagram showing a state where the first terminal is further press-fit into the second terminal from the state of FIG. 8B.
Figure 8D:
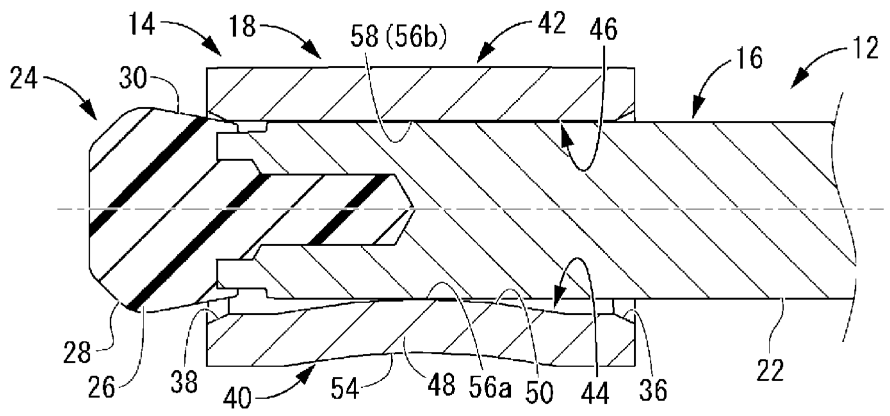
FIG. 8D is a diagram showing a state where the first terminal is further press-fit into the second terminal from the state of FIG. 8C, wherein the first and second terminals are fit.

A model of a method for assembling the terminal unit 10 by press-fitting the columnar connecting portion 16 of the first terminal 12 into the tubular connecting portion 18 of the second terminal 14 shaped as described above is described using FIGS. 8A to 8D and 9. Note that a state of progress of press-fitting the columnar connecting portion 16 into the tubular connecting portion 18 is shown in a stepwise manner in FIGS. 8A to 8D, wherein FIG. 8A shows a start state of the press-fitting and FIGS. 8B and 8C show a state where the resin cap 24 is located in the tubular connecting portion 18. Further, FIG. 8D shows an end state of the press-fitting and shows the aforementioned state of FIGS. 1 to 4 where the terminal unit 10 is assembled.

Figure 9:
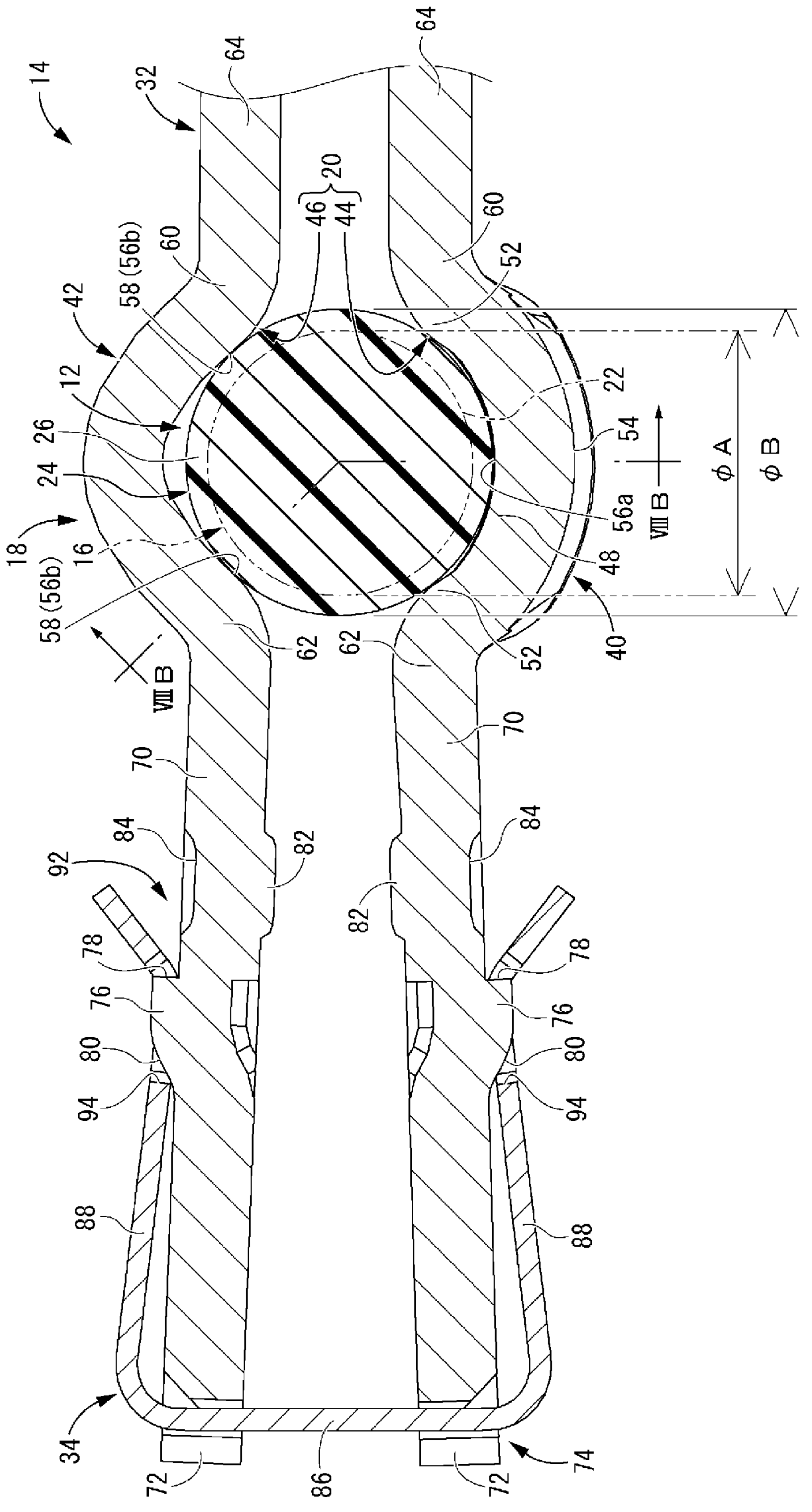
FIG. 9 is a section along IX-IX in FIG. 8B.
Figure 10:
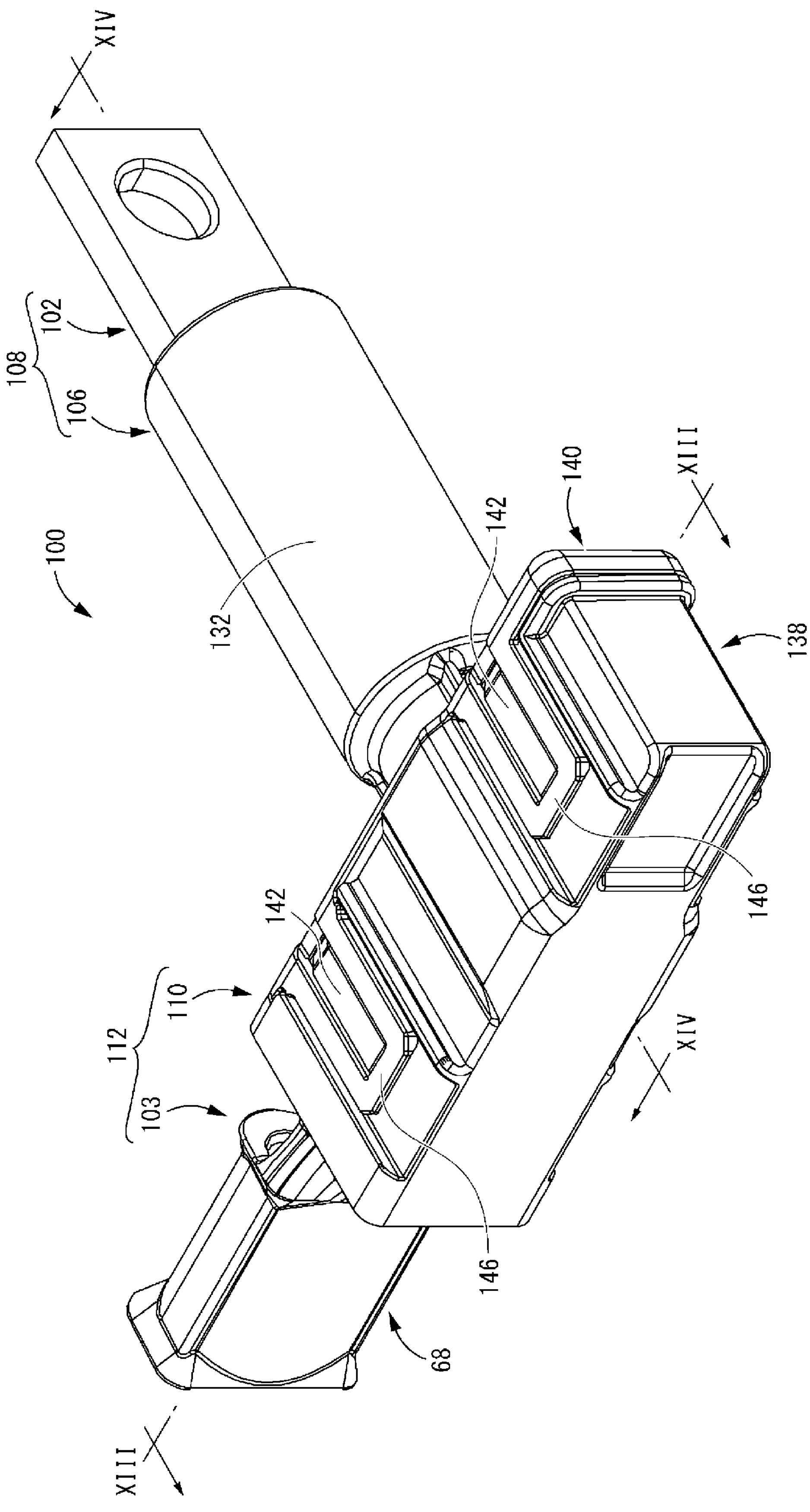
FIG. 10 is a perspective view of a terminal unit according to a second embodiment.
Figure 11:
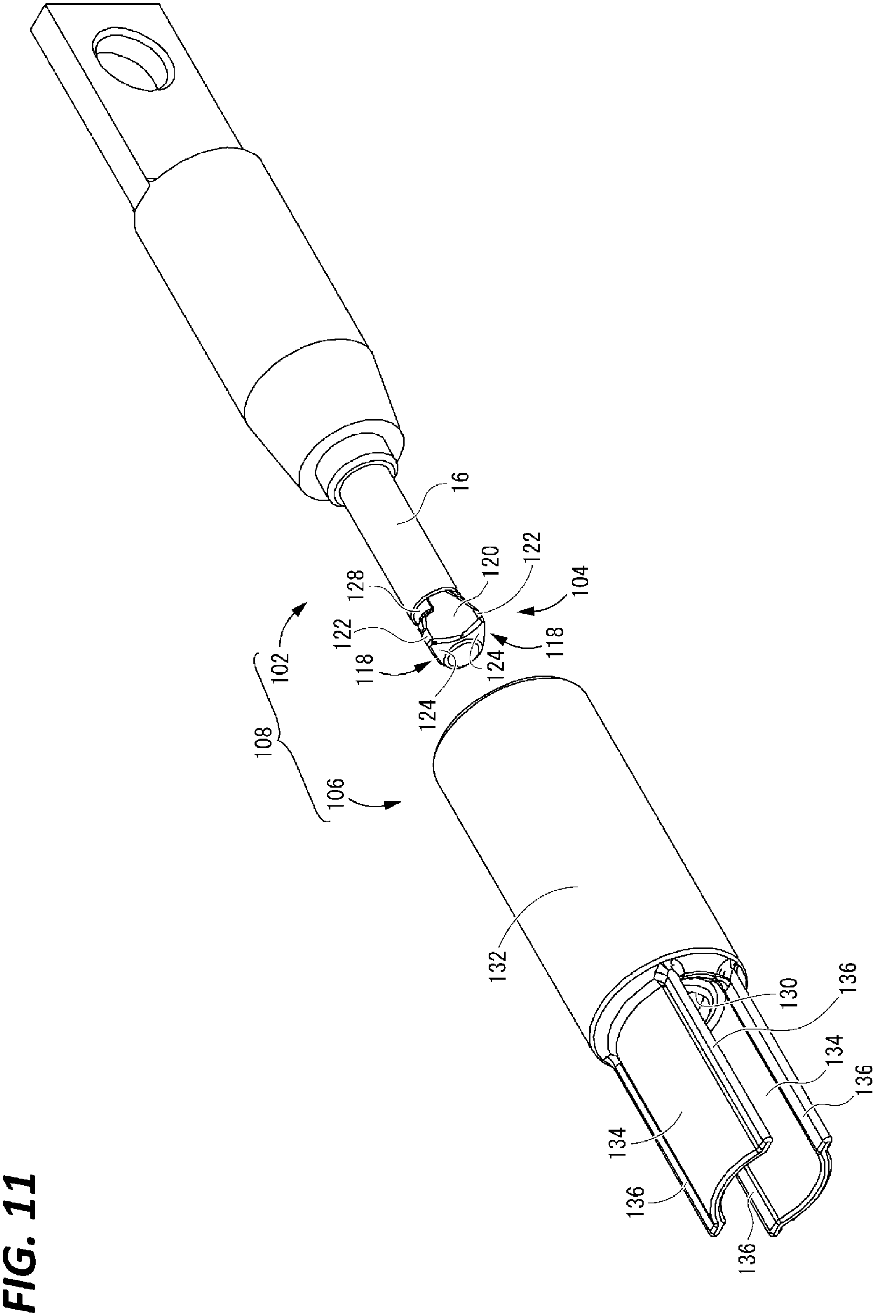
FIG. 11 is an exploded perspective view of a housing-equipped first terminal constituting the terminal unit shown in FIG. 10.

First, as shown in FIG. 8A, the first terminal 12 is brought closer to the end part of the tubular connecting portion 18 on the entrance side (right side) in the second terminal 14. Here, the tubular connecting portion 18 is in the state of FIG. 7 mounted with the clip spring 34, and the inner diameter (diameter of the virtual circle passing through the arcuate protrusion 48 and each linear contact portion 58) is ϕC. As described above, this inner diameter ϕC of the tubular connecting portion 18 is smaller than the outer diameter ϕB of the large-diameter portion 26 of the resin cap 24 and the outer diameter ϕA of the columnar connecting portion 16. In this way, when the columnar connecting portion 16 is press-fit into the tubular connecting portion 18, the entrance side reduced diameter surface 36 provided on the inner circumferential end part of the tubular connecting portion 18 on the entrance side and the tip side reduced diameter surface 28 provided on the tip side of the large-diameter portion 26 of the columnar connecting portion 16 first come into contact. By bringing the respective reduced diameter surfaces 28, 36 reduced in diameter toward the tip side in the insertion direction into contact with each other, the insertion resistance of the columnar connecting portion 16 into the tubular connecting portion 18 is reduced. By further press-fitting the columnar connecting portion 16 into the tubular connecting portion 18, the resin cap 24 is located in the tubular connecting portion 18 as shown in FIGS. 8B and 9.

By press-fitting the columnar connecting portion 16 into the tubular connecting portion 18 in this way, the first and second peripheral walls 40, 42 are pushed and expanded in the directions separating from each other by the resin cap 24 against biasing forces of the clip spring 34. That is, with the resin cap 24 located in the tubular connecting portion 18, the first and second peripheral walls 40, 42 are resiliently deformed in the directions separating from each other against the biasing forces of the clip spring 34 and the tubular connecting portion 18 is expanded in diameter and deformed. Here, since the respective inner protrusions 52 project radially inward more than the arcuate protrusion 48 on the inner peripheral surface 44 of the first peripheral wall 40, the first and second peripheral walls 40, 42 contact the resin cap 24 at four positions of the respective inner protrusions 52 and the respective linear contact portions 58 to be pushed and expanded. That is, as shown in FIG. 9, an outer diameter of a virtual circle passing through the respective inner protrusions 52 and the respective linear contact portions 58 is substantially equal to the outer diameter ϕB of the large-diameter portion 26 of the resin cap 24. Particularly, as shown in FIG. 8B, since the arcuate protrusion 48 is located radially outwardly of the inner protrusions 52 even when the large-diameter portion 26 of the resin cap 24 reaches the most projecting lateral center of the arcuate protrusion 48, the resin cap 24 and the arcuate protrusion 48 are separated by a short distance without contacting each other. Therefore, although the arcuate protrusion 48 in the first peripheral wall 40 and the resin cap 24 are separated in a cut plane shown in FIG. 8B, the inner protrusions 52 in the first peripheral wall 40 and the resin cap 24 are in contact with each other on a back side of the cutting plane shown in FIG. 8B.

As shown in FIG. 8C, the first terminal 12 is further press-fit into the second terminal 14 from the state shown in FIG. 8B. Here, since the respective inner protrusions 52 and the respective linear contact portions 58 are formed substantially over the entire length of the tubular connecting portion 18 in the length direction (lateral direction), the first terminal 12 is press-fit with the respective inner protrusions 52 and the respective linear contact portions 58 held in contact with the resin cap 24 while the separation distance of the first and second peripheral walls 40, 42 remains unchanged. Although the arcuate protrusion 48 in the first peripheral wall 40 and the resin cap 24 are separated also in a cut plane shown in FIG. 8C, the inner protrusions 52 in the first peripheral wall 40 and the resin cap 24 are in contact with each other on a back side of the cutting plane shown in FIG. 8C. Further, the outer diameter ϕA of the columnar connecting portion 16 is smaller than the outer diameter ϕB of the large-diameter portion 26 of the resin cap 24. Thus, as shown in FIGS. 8B, 8C and 9 (shown by a two-dot chain line in FIG. 9), the outer peripheral surface (first contact point 22) of the columnar connecting portion 16 is not in contact with the second contact points 56*a*, 56*b* and 56*b* (arcuate protrusion 48 and linear contact portions 58) provided on the inner peripheral surface 20 (inner peripheral surfaces 44, 46) of the tubular connecting portion 18 with the resin cap 24 located in the tubular connecting portion 18. In other words, with the resin cap 24 located in the tubular connecting portion 18, the tubular connecting portion 18 is expanded in diameter and deformed by the resin cap 24, whereby the second contact points 56*a*, 56*b* and 56*b* provided on the inner peripheral surface 20 of the tubular connecting portion 18 are pushed in directions separating from the first contact point 22 constituted by the outer peripheral surface of the columnar connecting portion 16. In this way, the second contact points 56*a*, 56*b* and 56*b* are separated from the first contact point 22 in the first embodiment.

Thereafter, the first terminal 12 is further press-fit into the second terminal 14, and the large-diameter portion 26 of the resin cap 24 is caused to reach the tip side in the press-fitting direction (left side) further than the respective inner protrusions 52 and the respective linear contact portions 58 as shown in FIG. 8D, thereby bringing the large-diameter portion 26 out of contact with the respective inner protrusions 52 and the respective linear contact portions 58. In this way, the first and second peripheral wall portions 40, 42 are displaced in the directions approaching each other according to the biasing forces of the clip spring 34 to hold the columnar connecting portion 16 by the tubular connecting portion 18 as shown in FIGS. 1 to 4 and 8D. Specifically, the second contact points 56*a*, 56*b* and 56*b* (the circumferential center of the arcuate protrusion 48 and the respective linear contact portions 58) on the inner peripheral surface 20 of the tubular connecting portion 18 are brought into contact with the outer peripheral surface (first contact point 22) of the columnar connecting portion 16 to support the columnar connecting portion 16 at three positions in the circumferential direction in the tubular connecting portion 18. In short, with the resin cap 24 arranged to project from the tubular connecting portion 18 toward the tip side in the press-fitting direction at an assembly completed position of the columnar connecting portion 16 with the tubular connecting portion 18, the second contact points 56*a*, 56*b* and 56*b* are pressed in contact with the first contact point 22 by a resilient restoring force of the tubular connecting portion 18 in a diameter reducing direction according to the biasing forces of the clip spring 34. In this way, the press-fitting of the columnar connecting portion 16 into the tubular connecting portion 18 is completed and the terminal unit 10 is completed.

In the terminal unit 10 of the first embodiment structured as described above, the resin cap 24 having the maximum outer diameter larger than the columnar connecting portion 16 radially pushes and expands and expansively deforms the tubular connecting portion 18 in press-fitting the columnar connecting portion 16 of the first terminal 12 into the tubular connecting portion 18 of the second terminal 14. Thus, with the resin cap 24 located in the tubular connecting portion 18, the contact of the first contact point 22 constituted by the outer peripheral surface of the columnar connecting portion 16 and the second contact points 56*a*, 56*b* and 56*b* provided on the inner peripheral surface 20 of the tubular connecting portion 18 is avoided. That is, in press-fitting the columnar connecting portion 16 into the tubular connecting portion 18, the sliding contact of the synthetic resin and the metal by the resin cap 24 and the tubular connecting portion 18 is realized instead of the sliding contact of the metals by the outer peripheral surface of the columnar connecting portion and the inner peripheral surface of the tubular connecting portion as before. Thus, the wear of the plating associated with the rubbing of the columnar connecting portion 16 and the tubular connecting portion 18 is suppressed. Note that, with the press-fitting of the columnar connecting portion 16 into the tubular connecting portion 18 completed and the resin cap 24 arranged to project from the tubular connecting portion 18 toward the tip side in the press-fitting direction (left side), the tubular connecting portion 18 is reduced in diameter and deformed as compared to the case where the resin cap 24 is located in the tubular connecting portion 18. In this way, the first contact point 22 constituted by the outer peripheral surface of the columnar connecting portion 16 and the second contact points 56*a*, 56*b* and 56*b* provided on the inner peripheral surface 20 of the tubular connecting portion 18 are stably held in contact and the first and second terminals 12, 14 are conductively connected.

Further, also in pulling out the columnar connecting portion 16 from the tubular connecting portion 18, the contact of the first contact point 22 and the second contact points 56*a*, 56*b* and 56*b* is avoided since the tubular connecting portion 18 is expanded in diameter and deformed by the resin cap 24. In this way, even if the columnar connecting portion 16 is repeatedly inserted into and withdrawn from the tubular connecting portion 18, the sliding contact of the metals is avoided and the wear of plating is suppressed. As a result, although silver plating relatively less likely to be worn has been conventionally adopted for the outer peripheral surface of the columnar connecting portion and the inner peripheral surface of the tubular connecting portion, tin plating low in cost can be adopted and a cost reduction can be realized by suppressing the wear of plating.

The tubular connecting portion 18 includes the pair of inner protrusions 52, 52 separated from each other in the circumferential direction and the second contact point 56*a* (arcuate protrusion 48) located between the pair of inner protrusions 52, 52 in the circumferential direction. The pair of inner protrusions 52, 52 project radially inward more than the arcuate protrusion 48, and the both axial ends of the pair of inner protrusions 52, 52 are located axially outwardly of those of the arcuate protrusion 48 in the axial direction. In this way, in press-fitting the columnar connecting portion 16 into the tubular connecting portion 18, the tubular connecting portion 18 can be stably expanded in diameter and deformed by the contact of the pair of inner protrusions 52, 52 and the resin cap 24. Note that the contact of the resin cap 24 and the arcuate protrusion 48 is avoided when the tubular connecting portion 18 is expanded in diameter and deformed by the resin cap 24.

Further, with the press-fitting of the columnar connecting portion 16 into the tubular connecting portion 18 completed and the resin cap 24 arranged further on the tip side in the press-fitting direction than the tubular connecting portion 18, the pair of inner protrusions 52, 52 and the resin cap 24 are brought out of contact and the tubular connecting portion 18 is reduced in diameter and deformed. In this way, the outer peripheral surface (first contact point 22) of the columnar connecting portion 16 and the second contact point 56*a* of the arcuate protrusion 48 come into contact with each other. That is, in the tubular connecting portion 18, contact parts (the pair of inner protrusions 52, 52) with the resin cap 24 and a contact part (arcuate protrusion 48) with the first contact point 22 can be provided at positions different in the circumferential direction. In this way, even if the plating of the pair of inner protrusions 52, 52 is scraped due to the contact of the resin cap 24 and the pair of inner protrusions 52, 52 in press-fitting the columnar connecting portion 16 into the tubular connecting portion 18, there is no influence on the contact parts with the first contact point 22 and the conductively connected state of the columnar connecting portion 16 and the tubular connecting portion 18 is stably maintained in the press-fitting completed state.

Further, the both axial ends of the pair of inner protrusions 52, 52 are located axially outwardly of those of the arcuate protrusion 48. Thus, the resin cap 24 comes into contact with the pair of inner protrusions 52, 52 and the tubular connecting portion 18 is expanded in diameter and deformed not only in press-fitting the columnar connecting portion 16 into the tubular connecting portion 18, but also in pulling out the columnar connecting portion 16 from the tubular connecting portion 18. In this way, the contact of the first contact point 22 and the second contact point 56*a* is avoided and the wear of plating due to the sliding contact of the metals is stably prevented or suppressed. Therefore, the wear of plating is more reliably suppressed even if the columnar connecting portion 16 is repeatedly inserted into and withdrawn from the tubular connecting portion 18.

The tubular connecting portion 18 is configured to include the first and second peripheral wall portions 40, 42 arranged to face each other, and these first and second peripheral wall portions 40, 42 are biased in the directions approaching each other by the clip spring 34 serving as the resilient member. By constituting the tubular connecting portion 18 by the plurality of peripheral wall portions and providing the resilient member (clip spring 34) for biasing the plurality of peripheral wall portions in the directions approaching each other in this way, the tubular connecting portion 18 that can be expanded in diameter and deformed can be easily configured. Particularly, by forming each of the first and second peripheral wall portions 40, 42 into a substantially arc shape and sandwiching and supporting the columnar connecting portion 16 from both radial sides by the separate resilient member (clip spring 34), a high contact pressure can be set between the columnar connecting portion 16 and the tubular connecting portion 18 and the terminal unit 10 can be suitably adopted as a high-voltage terminal unit of an electric vehicle or the like.

The first peripheral wall portion 40 is provided with the second contact point 56*a* by the top part of the arcuate protrusion 48, and the second peripheral wall portion 42 is provided with the pair of second contact points 56*b*, 56*b* by the top parts of the respective linear contact portions 58. In the projection (view from the vertical direction) of the first and second peripheral wall portions 40, 42, the arcuate protrusion 48 is located between the respective linear contact portions 58 in the front-rear direction. Thus, the three second contact points 56*a*, 56*b* and 56*b* are arranged in the tubular connecting portion 18 while being spaced apart by a predetermined distance in the circumferential direction. In this way, even if an external force in a twisting direction is applied to the columnar connecting portion 16 with the columnar connecting portion 16 fit and held in the tubular connecting portion 18, the detachment of the columnar connecting portion 16 from the tubular connecting portion 18 can be prevented.

The resin cap 24 has the tip side reduced diameter surface 28 on the tip side in the press-fitting direction of the columnar connecting portion 16 into the tubular connecting portion 18. Further, the tubular connecting portion 18 has the entrance side reduced diameter surface 36 on the inner circumferential end part on the entrance side of the columnar connecting portion 16. Thus, in press-fitting the columnar connecting portion 16 into the tubular connecting portion 18, the both reduced diameter surfaces 28, 36 come into contact, whereby a sudden increase in insertion resistance is avoided and the production of resin waste associated with strong abrasion of the inner circumferential end part of the tubular connecting portion 18 on the entrance side and the resin cap 24 is also suppressed. Similarly, the resin cap 24 has the base end side reduced diameter surface 30 on the base end side in the press-fitting direction of the columnar connecting portion 16 into the tubular connecting portion 18. Further, the tubular connecting portion 18 has the exit side reduced diameter surface 38 on the inner circumferential end part on the exit side of the columnar connecting portion 16. Thus, in pulling out the columnar connecting portion 16 from the tubular connecting portion 18, the both reduced diameter surfaces 30, 38 come into contact, whereby a sudden increase in pull-out resistance is avoided and the production of resin waste associated with strong abrasion of the inner circumferential end part of the tubular connecting portion 18 on the exit side and the resin cap 24 is also suppressed.

Second Embodiment

Next, a terminal unit 100 of a second embodiment of the present disclosure and a first terminal 102 and a second terminal 103 constituting the terminal unit 100 are described using FIGS. 10 to 17. The first terminal 102 of the second embodiment differs from the first terminal 12 of the first embodiment particularly in the structure of a resin cap 104. Further, the second terminal 103 of the second embodiment has substantially the same structure as in the first embodiment, but differs in that a first peripheral wall portion 40 is provided with no inner protrusions 52. Note that, in the second embodiment, a housing-equipped first terminal 108 is configured by assembling a first housing 106 with the first terminal 102, and a housing-equipped second terminal 112 is configured by assembling a second housing 110 with the second terminal 103.

By inserting the housing-equipped first terminal 108 into the housing-equipped second terminal 112, a first contact point 22 constituted by the outer peripheral surface of a columnar connecting portion 16 in the first terminal 102 and second contact points 56*a*, 56*b* provided on the inner peripheral surface of a tubular connecting portion 18 in the second terminal 103 contact each other, whereby the first and second terminals 102, 103 are conductively connected. In the following description, points of difference of the terminal unit 100 of the second embodiment from the terminal unit 10 of the first embodiment are described and the same members or parts as in the first embodiment are denoted by the same reference signs as in the first embodiment in figures and not described in detail.

<First Terminal 102>

Figure 13:
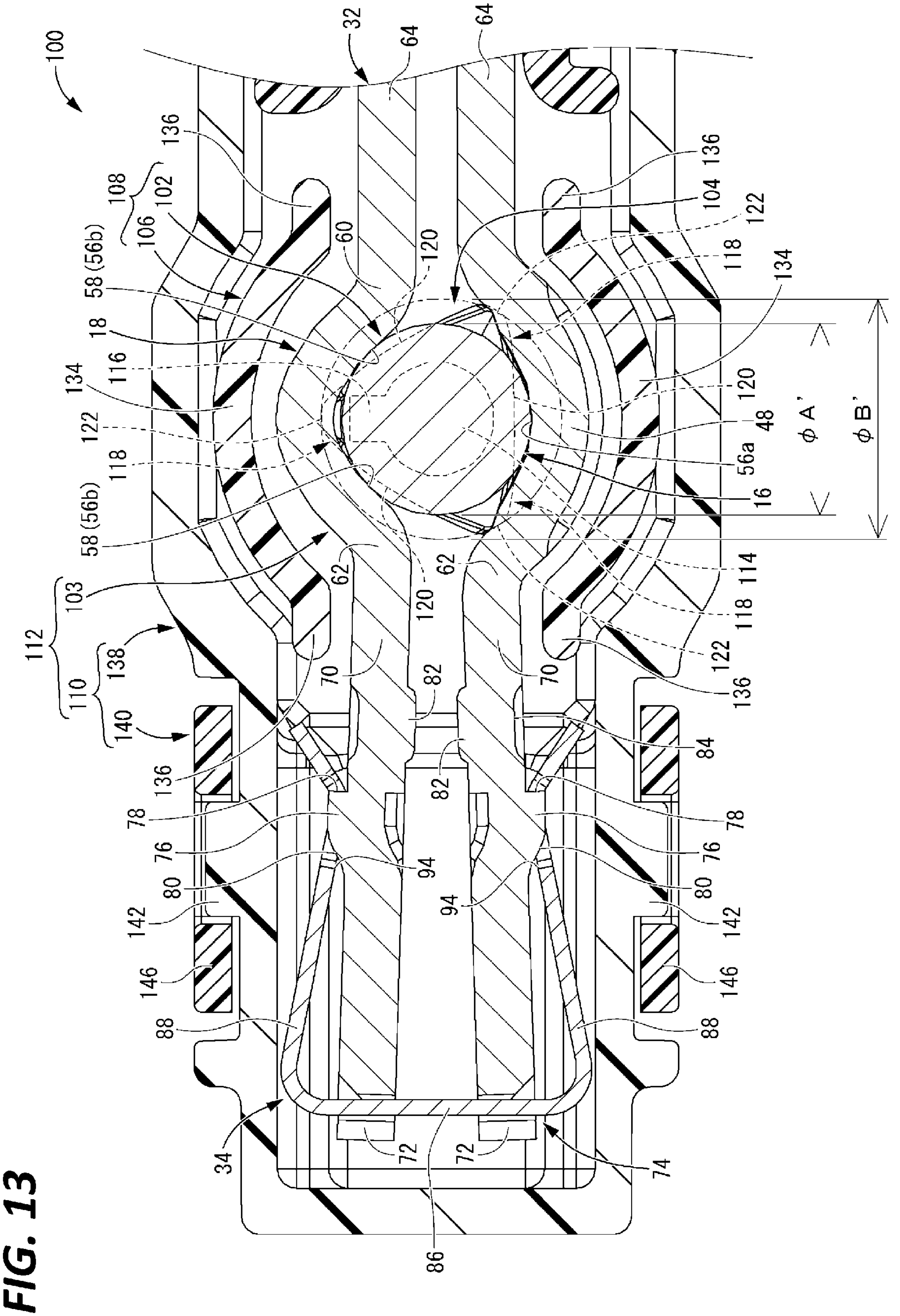
FIG. 13 is a section along XIII-XIII in FIG. 10.
Figure 14:
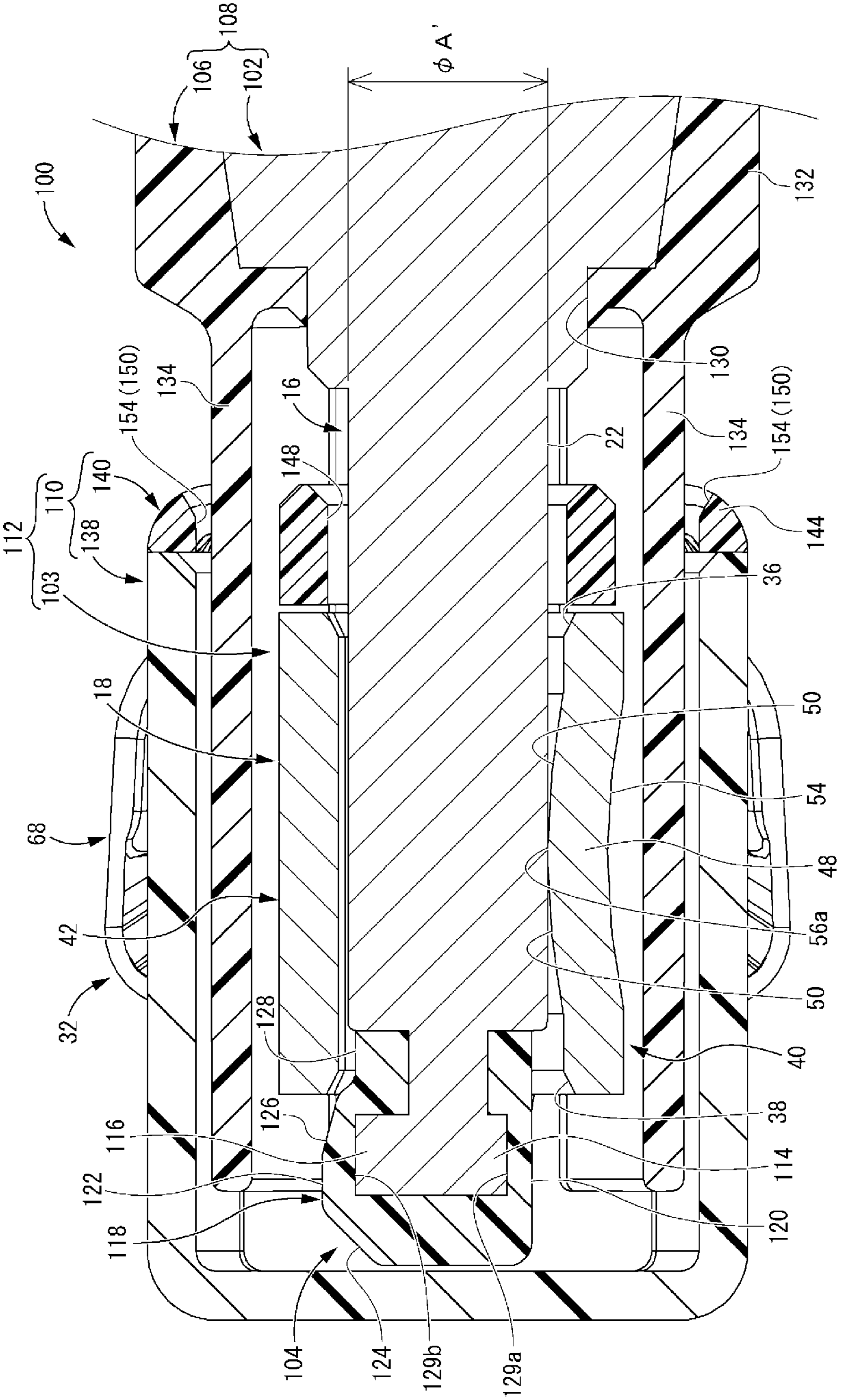
FIG. 14 is a section along XIV-XIV in FIG. 10.

The first terminal 102 includes the columnar connecting portion 16 having a maximum outer diameter ϕA' (see FIGS. 13 and 14). A fixing portion 114 having a circular cross-section, to which a resin cap 104 is fixed via a part reduced in diameter, is provided on the tip of the columnar connecting portion 16, and the resin cap 104 is provided with an engaged portion 116 projecting radially outward (upward in the second embodiment) in a circumferential part and to be engaged with an engaging portion 129*b* of the resin cap 104 to be described later. The resin cap 104 is provided to cover the fixing portion 114, the engaged portion 116 and the part reduced in diameter on the tip of the columnar connecting portion 16. By providing the resin cap 104 to ride over the fixing portion 114 and the engaged portion 116 in this way, a possibility of detachment of the resin cap 104 from the columnar connecting portion 16 can be reduced. The outer diameter ϕA' of the first terminal 102 is larger than an inner diameter ϕC of a tubular connecting portion 18 when a clip spring 34 is mounted as in the first embodiment.

<Resin Cap 104>

The resin cap 104 is shaped such that a radial dimension varies in a circumferential direction of the resin cap 104, and projecting contact portions 118 having a maximum radial dimension are provided at a plurality of positions separated from each other in the circumferential direction of the resin cap 104. In the second embodiment, as also shown in FIG. 13 and the like, the resin cap 104 has a substantially equilateral triangular shape in a projection in an axial direction (lateral direction) of the first terminal 102, and three projecting contact portions 118 are separated from each other and provided substantially at equal intervals (every 120°) in the circumferential direction of the resin cap 104. As shown in FIG. 13, an outer diameter of a virtual circle (shown by a two-dot chain line) passing through the projecting end surfaces of these three projecting contact portions 118 is ϕB' and larger than the outer diameter ϕA' of the columnar connecting portion 16. That is, each projecting contact portion 118 projects radially outward further than the outer peripheral surface (first contact point 22) of the columnar connecting portion 16.

Here, as described above, a curvature of the inner surface of an arcuate protrusion 48 is smaller than that of the outer peripheral surface of the columnar connecting portion 16 of the first terminal 102 in the first peripheral wall portion 40 of the second terminal 103. Further, linear contact portions 58, 58 are provided on an inner peripheral surface 46 of a second peripheral wall portion 42 of the second terminal 103 and, at the formation position of each linear contact portion 58, the inner peripheral surface 46 of the second peripheral wall portion 42 projects inward as compared to the case where the curvature of the inner peripheral surface of the second peripheral wall portion 42 is substantially constant. That is, in the first and second peripheral wall portions 40, 42 constituting the tubular connecting portion 18, a curvature of the second peripheral wall portion 42 is larger than that of the first peripheral wall portion 40 as a whole, and a space on an inner peripheral side of the first peripheral wall portion 40 is larger in the front-rear direction than a space on an inner peripheral side of the second peripheral wall portion 42.

Figure 17:
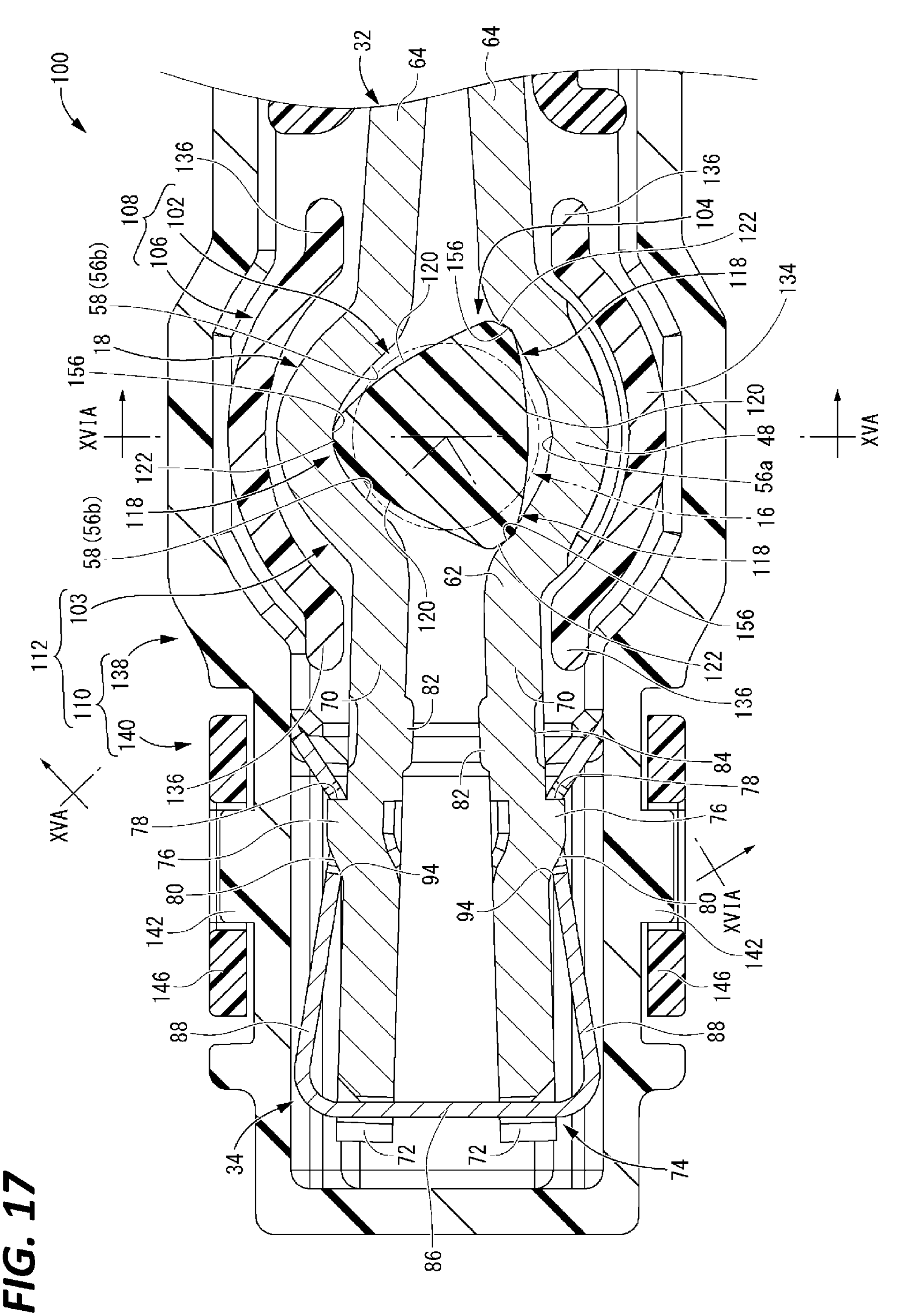
FIG. 17 is a section along XVII-XVII in FIG. 16B.

In this way, the resin cap 104 having a substantially equilateral triangular shape when viewed from the axial direction is inserted between the first and second peripheral wall portions 40, 42 with one of the three projecting contact portions 118 located on an upper side and the remaining two projecting contact portions 118 located on a lower side as shown in FIG. 13 and FIG. 17 to be described later. On the contrary, if an attempt is made to insert the resin cap 104 into the tubular connecting portion 18 with two of the three projecting contact portions 118 located on the upper side and the remaining one projecting contact portion 118 located on the lower side, the two projecting contact portions 118 located on the upper side come into contact with parts of the second peripheral wall portion 42 where the inwardly projecting linear contact portions 58, 58 are formed and the resin cap 104 cannot be inserted. That is, in the second embodiment, by providing the inwardly projecting linear contact portions 58, 58 on the second peripheral wall portion 42, only one projecting contact portion 118 can be inserted into the inner peripheral side of the second peripheral wall portion 42 and the tubular connecting portion 18 and the resin cap 104 can be positioned in the circumferential direction of the resin cap 104 in inserting the resin cap 104 into the tubular connecting portion 18.

Note that, although radial projection dimensions (separation distances in the radial direction from a center axis of the resin cap 104 to the projecting end surfaces of the respective projecting contact portions 118) of the three projecting contact portions 118 are respectively substantially equal in the second embodiment, at least one radial projection dimension may be different. For example, the radial projection dimension of one of the three projecting contact portions 118 may be larger than those of the remaining two projecting contact portions 118. The one projecting contact portion 118 projecting more than the other two may be inserted as an engaging portion into the side of the second peripheral wall portion 42. In such a case, if the one projecting contact portion 118 projecting more than the other two projecting contact portions 118 is located on the lower side (side of the first peripheral wall portion 40), this projecting contact portion 118 and the first peripheral wall portion 40 may come into contact to make it impossible to insert the resin cap 104 into the tubular connecting portion 18. By having such a shape, a more advanced positioning effect in the circumferential direction is achieved.

In parts of the resin cap 104 where the respective projecting contact portions 118 are not provided (parts between the respective projecting contact portions 118 in the circumferential direction), the outer peripheral surface of the columnar connecting portion 16 projects radially outward further than the outer peripheral surface of the resin cap 104 in the projection in the axial direction of the first terminal 102. Any of parts connecting between the projecting contact portions 118, 118 adjacent in the circumferential direction of the resin cap 104 on the outer peripheral surface of the resin cap 104 is a planarly extending flat surface 120.

Further, a flat surface 122 extending in the axial direction (lateral direction) of the resin cap 104 while having a predetermined width is provided on the outer peripheral surface (projecting end surface) of each projecting contact portion 118. That is, in the resin cap 104, the flat surface 122 on each projecting contact portion 118 is a part having a maximum radial dimension in the circumferential direction of the resin cap 104. In short, in the second embodiment, the flat surface 122 is provided on each of vertices of the substantially equilateral triangular shape, which is the shape of the resin cap 104 when viewed from the axial direction. In the circumferential direction of the resin cap 104, the flat surfaces 122 connecting between the projecting contact portions 118, 118 are provided between the respective flat surfaces 122 in the circumferential direction.

Further, as in the first embodiment, a tip side reduced diameter surface 124 gradually reduced in diameter (reduced in radial projection dimension) toward a tip side in the press-fitting direction is provided on a part adjacent to the flat surface 122 on the tip side in the press-fitting direction (left side) in each projecting contact portion 118 of the resin cap 104. Further, a base end side reduced diameter surface 126 gradually reduced in diameter (reduced in radial projection dimension) toward a base end side in the press-fitting direction is provided on a part adjacent to the flat surface 122 on the base end side in the press-fitting direction (right side) in each projecting contact portion 118. In the second embodiment, the base end side reduced diameter surface 126 has a more gentle angle of inclination with respect to the axial direction (lateral direction) of the resin cap 104 than the tip side reduced diameter surface 124, thereby reducing a possibility that the resin cap 104 is detached from the columnar connecting portion 16 as the base end side reduced diameter surfaces 126 and an exit side reduced diameter surface 38 come into contact in pulling out the columnar connecting portion 16 of the first terminal 102 from the tubular connecting portion 18 of the second terminal 103. Further, in the second embodiment, a recess 128 recessed toward an inner peripheral side is provided in a base end part (right part) of the base end side reduced diameter surface 126 on the upper side, and the orientation of the first terminal 102 about the center axis can be grasped, for example, by visually confirming this recess 128 from outside.

The inner peripheral surface of the resin cap 104 is shaped to correspond to the tip of the columnar connecting portion 16. That is, the resin cap 104 includes an accommodating portion **129*a* having a circular cross-section for accommodating the fixing portion 114 inside, and the engaging portion 129*b* corresponding to the engaged portion 116 provided on the columnar connecting portion 16 is provided in a circumferential part of the accommodating portion 129*a*. In the second embodiment, the engaging portion 129*b* is provided atop the accommodating portion 129*a*. In this way, when the resin cap 104 is mounted on the columnar connecting portion 16, a rotational displacement of the resin cap 104 with respect to the columnar connecting portion 16 is limited by the engagement of the engaged portion 116 and the engaging portion 129*b* and the resin cap 104 can be positioned in the circumferential direction of the resin cap 104 with respect to the columnar connecting portion 16**.

<First Housing 106>

The first housing 106 has a substantially tubular shape as a whole and includes a peripheral wall 132 having a through hole 130 extending in the lateral direction, and curved plate portions 134 projecting leftward and having a predetermined length (lateral dimension) are provided on the left end surface of the peripheral wall 132. A pair of the curved plate portions 134 are facing each other while being separated from each other in the vertical direction. Each curved plate portion 134 is curved along a circumferential direction of the peripheral wall 132 and has a predetermined dimension in the front-rear direction. Further, flat plate portions 136, 136 projecting outward in the front-rear direction, which is one radial direction of the peripheral wall 132, are provided on both circumferential end parts of each curved plate portion 134. These flat plate portions 136 are provided substantially over the entire length in a length direction (lateral direction) of each curved plate portion 134.

The housing-equipped first terminal 108 is configured by inserting the first terminal 102 into the through hole 130 of the first housing 106 and fixing the first housing 106 and the first terminal 102 to each other by press-fitting, concave-convex locking, adhesion, welding or the like. As also shown in FIG. 14, in the housing-equipped first terminal 108, the columnar connecting portion 16 is located on inner peripheral sides of the respective curved plate portions 134 while being spaced apart by a predetermined radial distance from the respective curved plate portions 134, and the columnar connecting portion 16 is covered by the respective curved plate portions 134 over the entire length in the length direction (lateral direction). Further, a tip part (left part) of the resin cap 104 projects leftward from the respective curved plate portions 134. In the second embodiment, the first terminal 102 and the first housing 106 are so fixed that the recess 128 provided in the resin cap 104 faces upward, i.e. one of the three projecting contact portions 118 is facing the upper curved plate portion 134 in the vertical direction and the remaining two projecting contact portions 118 are facing the lower curved plate portion 134 in the vertical direction.

<Second Housing 110>

Figure 12:
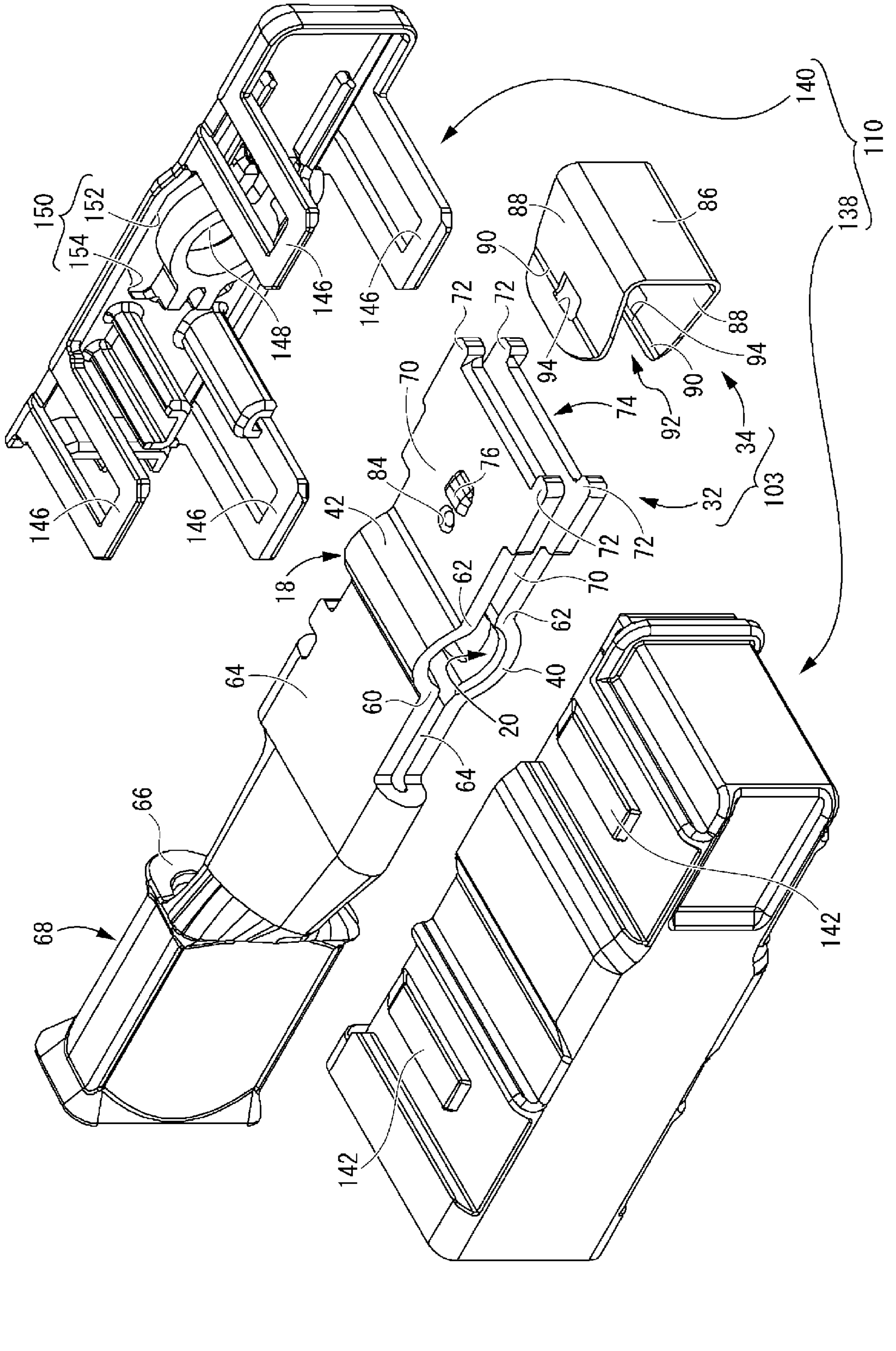
FIG. 12 is an exploded perspective view of a housing-equipped second terminal constituting the terminal unit shown in FIG. 10.

As also shown in FIG. 12, the second housing 110 includes a substantially box-shaped second housing body 138 and a second housing lid portion 140 for covering an opening of the second housing body 138. The second housing body 138 is open rightward and rearward, the second terminal 103 is insertable through a right opening, and a rear part of the second terminal 103 can project to the outside of the second housing body 138 through a rear opening of the second housing body 138 with the second terminal 103 inserted in the second housing body 138 from right and arranged inside the second housing body 138. A plurality of lock protrusions 142 are provided on the surface of the second housing body 138.

The second housing lid portion 140 is assembled to cover the right opening of the second housing body 138. That is, the second housing lid portion 140 includes a base plate portion 144 of such a size that can cover the right opening of the second housing body 138, and a plurality of lock frame bodies 146 projecting toward the second housing body 138 are provided on an outer peripheral edge part of the base plate portion 144. By engaging these lock protrusions 142 and lock frame bodies 146, the second housing lid portion 140 is fixedly mounted on the second housing body 138.

An insertion hole 148 penetrating through the base plate portion 144 in a plate thickness direction (lateral direction) is formed at a position of the base plate portion 144 corresponding to the tubular connecting portion 18 with the second terminal 103 accommodated in the second housing 110. In this way, the tubular connecting portion 18 and the insertion hole 148 communicate in the lateral direction.

Further, through windows 150 penetrating through the base plate portion 144 in the plate thickness direction and extending in the front-rear direction are formed on both upper and lower sides of the insertion hole 148 in the base plate portion 144.

The insertion hole 148 is formed in such a size that the resin cap 104 of the first terminal 102 is insertable therethrough, and each through window 150 is formed in such a size that each curved plate portion 134 and each flat plate portion 136 of the first housing 106 are insertable therethrough. That is, each through window 150 includes a curved part 152, which is provided in an intermediate part in the front-rear direction and into which the curved plate portion 134 is insertable, and flat parts 154, which extend outward in the front-rear direction from both end parts in the front-rear direction of the curved part 152 and into which the respective flat plate portions 136 are insertable. In this way, in inserting the columnar connecting portion 16 into the tubular connecting portion 18, the housing-equipped first terminal 108 is insertable into the housing-equipped second terminal 112 only in such an orientation that the respective curved plate portions 134 face each other in the vertical direction. As a result, the effect of positioning the tubular connecting portion 18 and the resin cap 104 in the circumferential direction is achieved also by the respective curved plate portions 134 and the respective flat plate portions 136 in the first housing 106 and the respective through windows 150 in the second housing 110.

<Assembly of Terminal Unit 100>

Figure 15A:
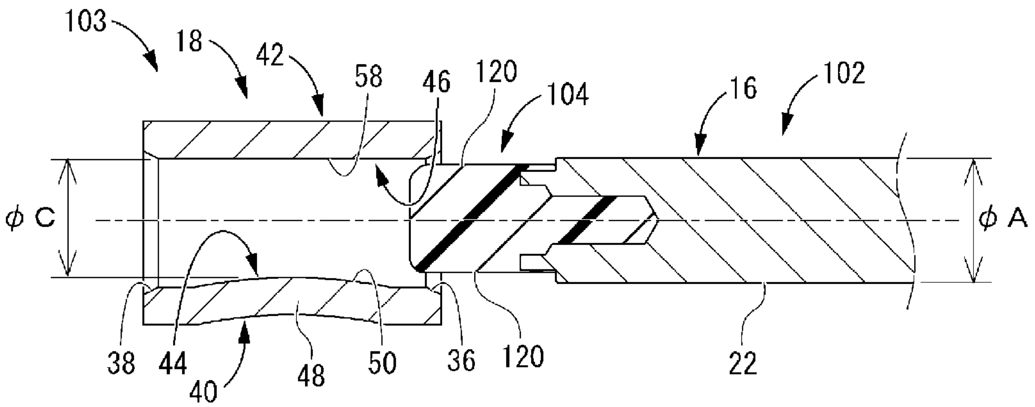
FIG. 15A is a diagram showing a model of a state when a first terminal is press-fit into a second terminal, wherein a state where the press-fitting of the first terminal into the second terminal is started is shown by a cross-section along XVA-XVA in FIG. 17.
Figure 15B:
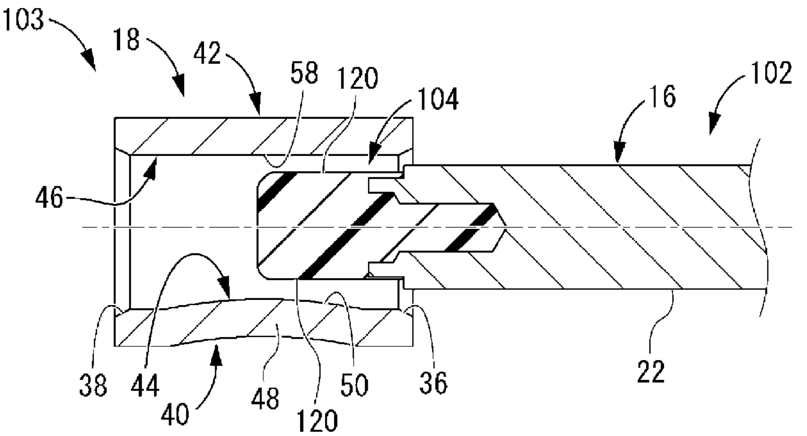
FIG. 15B is a diagram showing a state where the first terminal is further press-fit into the second terminal from the state of FIG. 15A, wherein a resin cap is located in a tubular connecting portion.
Figure 15C:
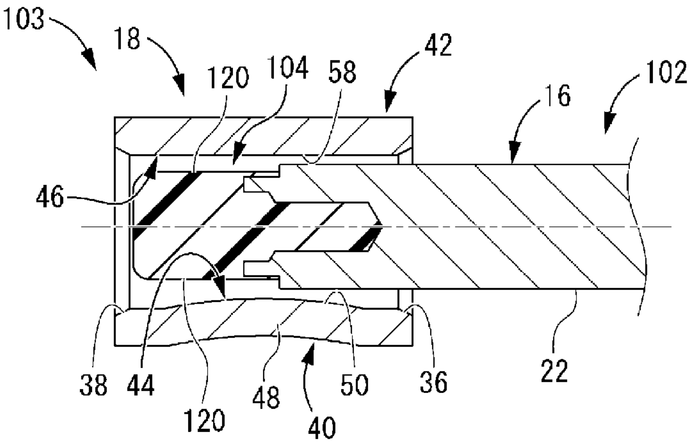
FIG. 15C is a diagram showing a state where the first terminal is further press-fit into the second terminal from the state of FIG. 15B, wherein the resin cap is located in the tubular connecting portion.
Figure 15D:
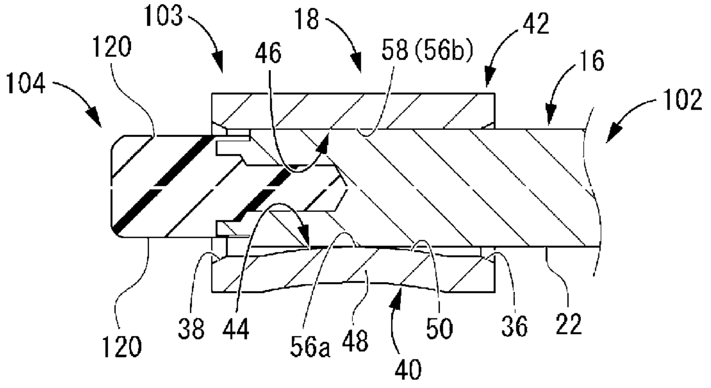
FIG. 15D is a diagram showing a state where the first terminal is further press-fit into the second terminal from the state of FIG. 15C, wherein the first and second terminals are fit.
Figure 16A:
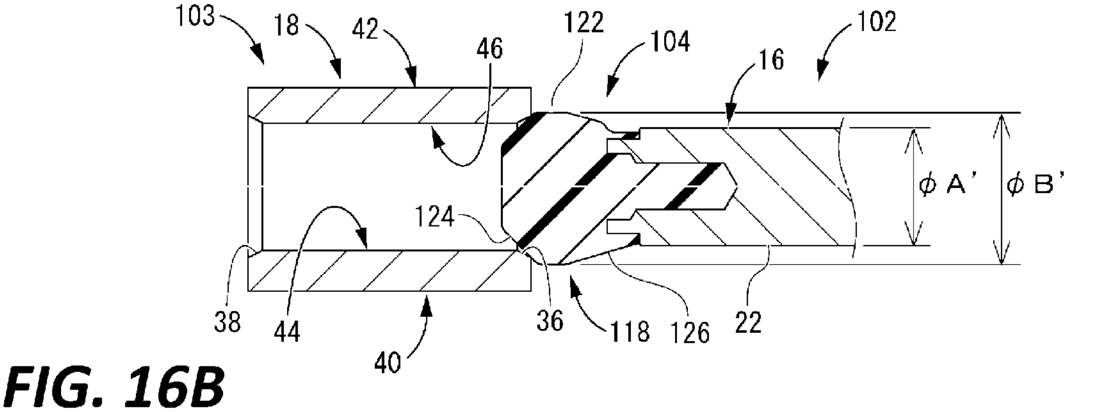
FIG. 16A is a diagram showing a model of the state when the first terminal is press-fit into the second terminal, wherein the state where the press-fitting of the first terminal into the second terminal is started is shown by a cross-section along XVIA-XVIA in FIG. 17.
Figure 16B:
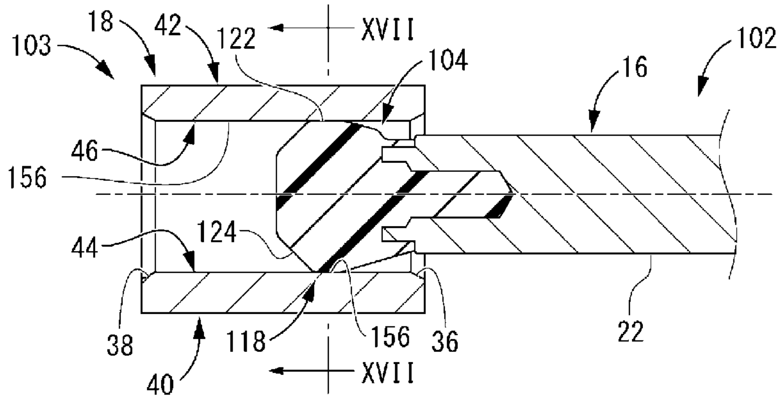
FIG. 16B is a diagram showing a state where the first terminal is further press-fit into the second terminal from the state of FIG. 16A, wherein the resin cap is located in the tubular connecting portion.
Figure 16C:
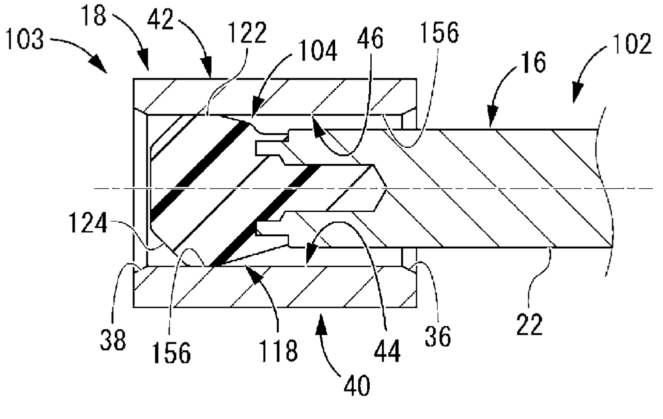
FIG. 16C is a diagram showing a state where the first terminal is further press-fit into the second terminal from the state of FIG. 16B, wherein the resin cap is located in the tubular connecting portion.
Figure 16D:
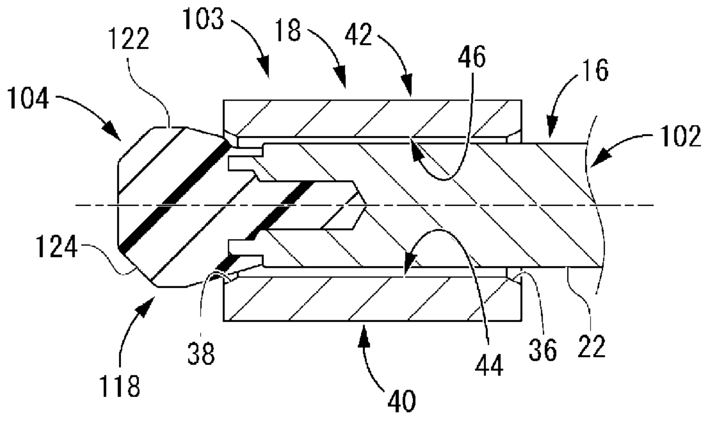
FIG. 16D is a diagram showing a state where the first terminal is further press-fit into the second terminal from the state of FIG. 16C, wherein the first and second terminals are fit.

A model of a method for assembling the terminal unit 100 by inserting the columnar connecting portion 16 of the first terminal 102 into the tubular connecting portion 18 of the second terminal 103 in the second embodiment is described using FIGS. 15A to 15D, FIGS. 16A to 16D and FIG. 17. A state of progress of inserting the columnar connecting portion 16 into the tubular connecting portion 18 is shown in a stepwise manner in FIGS. 15A to 15D and FIGS. 16A to 16D. Note that FIGS. 15A to 15D and FIGS. 16A to 16D differ only in cutting section line, FIGS. 15A and 16A, FIGS. 15B and 16B, FIGS. 15C and 16C and FIGS. 15D and 16D respectively show the same stage in the insertion of the columnar connecting portion 16 into the tubular connecting portion 18. That is, FIGS. 15A and 16A show a start state of the insertion and FIGS. 15B and 16B and FIGS. 15C and 16C show a state where the resin cap 104 is located in the tubular connecting portion 18. Further, FIGS. 15D and 16D show an end state of the insertion and shows the aforementioned state of FIGS. 10, 13 and 14 where the terminal unit 100 is assembled. Note that the first and second housings 106, 110 are not shown in FIGS. 15A to 15D and FIGS. 16A to 16D. A structure for fixing the columnar connecting portion 16 and the tubular connecting portion 18 is not limited and a structure similar to that of the first embodiment is shown in FIGS. 15A to 15D and FIGS. 16A to 16D.

First, as shown in FIGS. 15A and 16A, the first terminal 102 is brought closer to the end part of the tubular connecting portion 18 on the entrance side (right side) in the second terminal 103. Note that, although not shown in FIGS. 15A and 16A, the resin cap 104 is inserted through the insertion hole 148 in the second housing lid portion 140 of the second housing 110 and approaches the tubular connecting portion 18 from outside through the insertion hole 148. The inner diameter of the tubular connecting portion 18 at this point of time is ϕC (see FIG. 15A). The inner diameter ϕC of the tubular connecting portion 18 is smaller than the outer diameter ϕB' of the virtual circle passing through the projecting end surfaces of the respective projecting contact portions 118 in the resin cap 104, and the respective tip side reduced diameter surfaces 124 provided on the respective projecting contact portions 118 in the resin cap 104 and a tip side reduced diameter surface 36 of the tubular connecting portion 18 first come into contact as shown in FIG. 16A in inserting the columnar connecting portion 16 into the tubular connecting portion 18. By bringing the reduced diameter surfaces 36, 124 respectively reduced in diameter toward the tip side in an insertion direction into contact in this way, the insertion resistance of the columnar connecting portion 16 (resin cap 104) into the tubular connecting portion 18 is reduced.

In the second embodiment, the respective projecting contact portions 118 are provided at the three positions on the circumference of the resin cap 104, and the respective tip side reduced diameter surfaces 124 come into contact with the tip side reduced diameter surface 36 at three positions on the circumference of the tip side reduced diameter surface 36. Parts of the resin cap 104 other than the parts where the respective projecting contact portions 118 are formed do not come into contact with the tip side reduced diameter surface 36 of the tubular connecting portion 18 as shown in FIG. 15A. By further inserting the resin cap 104 into the tubular connecting portion 18, the resin cap 104 is located in the tubular connecting portion 18 as shown in FIGS. 15B, 16B and 17. This insertion of the resin cap 104 into the tubular connecting portion 18 is realized with the tubular connecting portion 18 and the resin cap 104 positioned in the circumferential direction by the positioning action of the respective curved plate portions 134, the respective flat plate portions 136 and the respective through windows 150 in the circumferential direction in addition to the positioning action of the projecting contact portions 118 and the respective linear contact portions 58 in the circumferential direction as described above.

Since the outer diameter ϕB' of the virtual circle passing through the projecting end surfaces of the respective projecting contact portions 118 in the resin cap 104 is larger than the inner diameter ϕC of the tubular connecting portion 18, the resin cap 104 is press-fit and inserted into the tubular connecting portion 18. By press-fitting the resin cap 104 into the tubular connecting portion 18 in this way, the first and second peripheral wall portions 40, 42 are pushed and expanded in directions separating from each other by the resin cap 104 against biasing forces of the clip spring 34. Here, as shown in FIGS. 16B and 17, the respective flat surfaces 122 provided on the outer peripheral surfaces of the respective projecting contact portions 118 slide in contact with the inner peripheral surface 20 of the tubular connecting portion 18 at three positions on the circumference of the inner peripheral surface 20. These parts of the inner peripheral surface 20 of the tubular connecting portion 18 to be contacted by the respective flat surfaces 122 are respectively sliding surfaces 156. In the second embodiment, the sliding surfaces 156 are provided in a circumferential center of the inner peripheral surface 46 of the second peripheral wall portion 42 and both circumferential end parts of the arcuate protrusion 48 projecting inward in the first peripheral wall portion 40.

Further, as shown in FIGS. 15B and 17, the respective flat surfaces 120 connecting between the projecting contact portions 118, 118 in the resin cap 104 are separated from the circumferential center of the arcuate protrusion 48 and the respective linear contact portions 58 constituting the second contact portions 56*a*, 56*b*. In other words, when the columnar connecting portion 16 is press-fit into the tubular connecting portion 18, the respective projecting contact portions 118 of the resin cap 104 contact parts separated from the second contact portions 56*a*, 56*b* on the inner peripheral surface 20 of the tubular connecting portion 18 and the second contact portions 56*a*, 56*b* are separated from the resin cap 104.

Then, as shown in FIGS. 15C and 16C, the first terminal 102 is further press-fit into the second terminal 103 from the state shown in FIGS. 15B and 16B. A contact mode of the tubular connecting portion 18 and the resin cap 104 in the state shown in FIGS. 15C and 16C is the same as in the state shown in FIGS. 15B and 16B. The flat surfaces 122 of the respective projecting contact portions 118 are in contact with the respective sliding surfaces 156 (the circumferential center of the inner peripheral surface 46 of the second peripheral wall portion 42 and the both circumferential end parts of the arcuate protrusion 48 in the first peripheral wall portion 40) on the inner peripheral surface 20 of the tubular connecting portion 18, and the respective flat surfaces 120 connecting between the respective projecting contact portions 118, 118 are separated from the second contact portions 56*a*, 56*b* (the circumferential center of the arcuate protrusion 48 and the respective linear contact portions 58).

Thereafter, the first terminal 102 is further press-fit into the second terminal 103, the respective flat surfaces 122 of the resin cap 104 are caused to reach the tip side in the press-fitting direction (left side) further than the tubular connecting portion 18 and the respective flat surfaces 122 and the respective sliding surfaces 156 are brought out of contact as shown in FIGS. 15D and 16D. In this way, the first and second peripheral wall portions 40, 42 are displaced in the directions approaching each other according to biasing forces of the clip spring 34 to hold the columnar connecting portion 16 by the tubular connecting portion 18 as shown in FIGS. 10, 13, 14, 15D and 16D. In the fit state of the first and second terminals 102, 103, a contact mode of the first contact portion 22 and the second contact portions 56*a*, 56*b* and 56*b* is as in the first embodiment. That is, the outer peripheral surface of the columnar connecting portion 16 serving as the first contact portion 22 is in contact with the circumferential center of the arcuate protrusion 48 and the respective linear contact portions 58. Further, in the fit state of the first and second terminals 102, 103, the respective sliding surfaces 156 (the circumferential center of the inner peripheral surface 46 of the second peripheral wall portion 42 and the both circumferential end parts of the arcuate protrusion 48 in the first peripheral wall portion 40) are separated from the outer peripheral surface of the columnar connecting portion 16 serving as the first contact portion 22. In this way, the columnar connecting portion 16 is supported at three positions in the circumferential direction with respect to the tubular connecting portion 18. As a result, the press-fitting of the columnar connecting portion 16 into the tubular connecting portion 18 is completed and the terminal unit 100 is completed.

Also in the terminal unit 100 of the second embodiment, in press-fitting the columnar connecting portion 16 into the tubular connecting portion 18, the resin cap 104 of the first terminal 102 is inserted into the tubular connecting portion 18 to push and expand the tubular connecting portion 18, and the sliding of the metals on the outer peripheral surface of the columnar connecting portion 16 and the inner peripheral surface of the tubular connecting portion 18 is avoided. In this way, effects similar to those of the first embodiment can be achieved.

Particularly in the second embodiment, the respective sliding surfaces 156 to be contacted by the flat surfaces 122 of the respective projecting contact portions 118 of the resin cap 104 when the resin cap 104 is press-fit into the tubular connecting portion 18 and the second contact points 56*a*, 56*b* to be contacted by the outer peripheral surface (first contact point 22) of the columnar connecting portion 16 when the tubular connecting portion 18 and the columnar connecting portion 16 are fit are located at different positions in the circumferential direction on the inner peripheral surface 20 of the tubular connecting portion 18. In this way, even if the plating is scraped on the respective sliding surfaces 156 by the resin cap 104 when the resin cap 104 is press-fit into the tubular connecting portion 18, it does not affect the conductive state of the first contact point 22 and the second contact points 56*a*, 56*b* when the tubular connecting portion 18 and the columnar connecting portion 16 are fit, and the first and second terminals 102, 103 can be more reliably made conductive. Since such a configuration is realized by providing the resin cap 104 with the projecting contact portions 118 projecting radially outward further than the columnar connecting portion 16, manufacturing cost can be reduced as compared to the case where the inner protrusions 52 are provided on the first peripheral wall portion 40 as in the first embodiment.

The resin cap 104 includes the projecting contact portions 118 at the three positions in the circumferential direction, and the flat surfaces 120 are provided to connect between the respective projecting contact portions 118, 118. In this way, when the resin cap 104 is press-fit into the tubular connecting portion 18, the respective projecting contact portions 118 project radially outward further than the outer peripheral surface (first contact point 22) of the columnar connecting portion 16 at the three positions on the circumference and can slide on the respective sliding surfaces 156 on the inner peripheral surface 20 of the tubular connecting portion 18. Further, the resin cap 104 can be separated from the inner peripheral surface 20 of the tubular connecting portion 18 by providing the flat surfaces 120 on the parts of the resin cap 104 other than the projecting contact portions 118, and sliding in parts other than the respective projecting contact portions 118 is avoided.

Since the outer peripheral surfaces of the respective projecting contact portions 118 serve as the flat surfaces 122, the projecting end surfaces of the respective projecting contact portions 118 and the inner peripheral surface 20 of the tubular connecting portion 18 can be held substantially in surface contact in press-fitting the resin cap 104 into the tubular connecting portion 18. In this way, a contact pressure can be reduced, for example, as compared to the case where the respective projecting contact portions 118 and the tubular connecting portion 18 are held substantially in line contact and a possibility of producing resin waste due to the scraping of the resin cap 104 or the like can be reduced.

The resin cap 104 is provided with the engaging portion 129*b*, and the columnar connecting portion 16 is provided with the engaged portion 116 corresponding to the engaging portion 129*b*. In this way, when the resin cap 104 is mounted on the columnar connecting portion 16, a rotational displacement of the resin cap 104 with respect to the columnar connecting portion 16 can be limited and the resin cap 104 can be positioned in the circumferential direction of the resin cap 104 with respect to the columnar connecting portion 16 by the engagement of the engaging portion 129*b* and the engaged portion 116. As a result, at the time of fitting the first and second terminals 102, 103, the parts to be contacted by the projecting end surfaces of the respective projecting contact portions 118 of the resin cap 104 on the inner peripheral surface 20 of the tubular connecting portion 18 can be more reliably set at the positions different from the second contact points 56*a*, 56*b* in the circumferential direction.

MODIFICATIONS

Although the first and second embodiments have been described in detail as specific examples of the present disclosure, the present disclosure is not limited by this specific description. The present disclosure includes modifications, improvements and the like within a range in which the aim of the present disclosure can be achieved. For example, the following modifications of the embodiments are also included in the technical scope of the present disclosure.

(1) The structures of the columnar connecting portion and the tubular connecting portion are not limited to those described in the above embodiments. Although the columnar connecting portion 16 has a substantially true circular cross-sectional shape in the above embodiments, the columnar connecting portion 16 may, for example, have an elliptical, oval or semicircular cross-sectional shape or may have a polygonal cross-sectional shape without limitation to this. Further, the outer diameter of the columnar connecting portion needs not be constant and a protrusion or the like of such a size as not to protrude toward the outer peripheral side further than the outer peripheral surface of the resin cap may be provided on the outer peripheral surface of the columnar connecting portion. Further, the tubular connecting portion only has to have a tubular shape by having a peripheral wall portion, which can be expanded in diameter and deformed, and may be structured such that a resilient contact piece is folded into an outer tube portion as in the female terminal described in Patent Document 1. Although the tubular connecting portion 18 has a substantially hollow cylindrical shape in the above embodiments, the tubular connecting portion 18 may have a hollow elliptical cylindrical shape, a hollow oval cylindrical shape or a hollow semi-cylindrical shape or may have a polygonal tube shape without limitation to this.

(2) Although the large-diameter portion 26 having the maximum outer diameter is provided in the axially intermediate part of the resin cap 24 in the first embodiment, the outer diameter of the resin cap may be substantially constant in the axial direction. That is, the tip side reduced diameter surface and the base end side reduced diameter surface of the resin cap are not essential. In the case of providing the tip side reduced diameter surface and the base end side reduced diameter surface of the resin cap, the shapes of the both reduced diameter surfaces are not limited, but tapered surfaces having a substantially constant taper angle, chamfered curved surfaces or the like are preferably adopted.

(3) Although the first peripheral wall portion 40 is provided with the arcuate protrusion 48 and the pair of inner protrusions 52, 52 and the second peripheral wall portion 42 is provided with the pair of linear contact portions 58, 58 in the first embodiment, there is no limitation to this mode. That is, the tubular connecting portion may be expanded in diameter and deformed by the resin cap directly coming into contact with the inner peripheral surfaces of the first and second peripheral wall portions, and the outer peripheral surface (first contact point) of the columnar connecting portion may directly come into contact with the second contact points constituted by the inner peripheral surfaces of the first and second peripheral wall portions after the resin cap is passed through the tubular connecting portion.

(4) Although the arcuate protrusion 48 for coming into contact with the outer peripheral surface (first contact point 22) of the columnar connecting portion 16 and the respective inner protrusions 52 for coming into contact with the resin cap 24 are provided at the positions different in the circumferential direction in the first peripheral wall portion 40 in the first embodiment, the first peripheral wall portion may be provided with protrusions for coming into contact with both the outer peripheral surface of the columnar connecting portion and the resin cap like the linear contact portions 58 of the second peripheral wall portion 42 in the above embodiments. Further, the second peripheral wall portion may be provided with a protrusion to be contacted by the outer peripheral surface of the columnar connecting portion and a protrusion to be contacted by the resin cap at positions different in the circumferential direction, similarly to the first peripheral wall portion 40 in the above embodiment.

(5) The resilient member is not limited to the clip spring as in the above embodiments, but may be a coil spring or an annular resilient member.

(6) The shapes of the entrance side and exit side reduced diameter surfaces of the tubular connecting portion are not limited, but tapered surfaces having a substantially constant taper angle, chamfered curved surfaces or the like are preferably adopted. Note that these entrance side and exit side reduced diameter surfaces are not essential.

(7) Although the second contact points 56*a*, 56*b* and 56*b* of the tubular connecting portion 18 are pushed in the diameter expanding direction and separated from the outer peripheral surface (first contact point 22) of the columnar connecting portion 16 with the resin cap 24, 104 located in the tubular connecting portion 18 in the above embodiments, the first and second contact points may slide in contact to such an extent that the wear of plating caused by mutual sliding is not problematic even if the resin cap is located in the tubular connecting portion.

(8) Although the resin cap 104 has a substantially equilateral triangular shape when viewed from the axial direction of the resin cap 104 in the second embodiment, there is no limitation to this mode and the resin cap 104 may have an isosceles triangular shape or a polygonal shape with four or more corners when viewed from the axial direction. That is, the projecting contact portions are preferably provided at two or more positions in the circumferential direction of the resin cap and, in any case, the projecting end surfaces of the projecting contact portions preferably come into contact with the inner peripheral surface of the tubular connecting portion at positions separated from the second contact points in the circumferential direction.

(9) Although the inner protrusions 52 in the first embodiment are not provided on the first peripheral wall portion 40 in the second embodiment, the inner protrusions may be provided on the first peripheral wall portion also in the second embodiment and, for example, the projecting contact portions at two positions on the lower side may contact the respective inner protrusions.

LIST OF REFERENCE NUMERALS

- 10 terminal unit
- 12 first terminal
- 14 second terminal
- 16 columnar connecting portion
- 18 tubular connecting portion
- 20 inner peripheral surface (of tubular connecting portion)
- 22 first contact point (outer peripheral surface of columnar connecting portion)

24 resin cap
26 large-diameter portion
28 tip side reduced diameter surface
30 base end side reduced diameter surface
32 terminal fitting
34 clip spring (resilient member)
36 entrance side reduced diameter surface
38 exit side reduced diameter surface
40 first peripheral wall portion
42 second peripheral wall portion
44 inner peripheral surface (of first peripheral wall portion)
46 inner peripheral surface (of second peripheral wall portion)
48 arcuate protrusion
50 curved surface
52 inner protrusion
54 recess
56*a*, 56*b* second contact point
58 linear contact portion
60 first circumferential end part
62 second circumferential end part
64 base end side plate portion
66 crimping piece
68 wire crimping portion
70 tip side plate portion
72 positioning protrusion
74 clip spring mounting portion
76 protrusion
78 vertical surface
80 inclined surface
82 stopper
84 recess
86 coupling plate
88 pressing piece
90 bent portion
92 insertion opening
94 locking recess
100 terminal unit (second embodiment)
102 first terminal
103 second terminal
104 resin cap
106 first housing
108 housing-equipped first terminal
110 second housing
112 housing-equipped second terminal
114 fixing portion
116 engaged portion
118 projecting contact portion
120, 122 flat surface
124 tip side reduced diameter surface
126 base end side reduced diameter surface
128 recess
129*a* accommodating portion
129*b* engaging portion
130 through hole
132 peripheral wall portion
134 curved plate portion
136 flat plate portion
138 second housing body
140 second housing lid portion
142 lock protrusion
144 base plate portion
146 lock frame body
148 insertion hole
150 through window
152 curved part
154 flat part
156 sliding surface

What is claimed is:

1. A terminal unit, comprising:

a first terminal including a columnar connecting portion and a resin cap for covering a tip surface of the columnar connecting portion, the resin cap having a maximum outer diameter larger than that of the columnar connecting portion; and a second terminal including a tubular connecting portion resiliently deformable in a diameter expanding direction;

the columnar connecting portion being assembled with the tubular connecting portion by being press-fit into the tubular connecting portion with the resin cap in the lead, the tubular connecting portion being expanded in diameter and deformed by the resin cap with the resin cap located in the tubular connecting portion, whereby a second contact point provided on an inner peripheral surface of the tubular connecting portion is pushed in a direction separating from a first contact point constituted by an outer peripheral surface of the columnar connecting portion, and the second contact point being pressed into contact with the first contact point by a resilient restoring force of the tubular connecting portion in a diameter reducing direction with the resin cap arranged to project from the tubular connecting portion toward a tip side in a press-fitting direction.

2. The terminal unit of claim 1, wherein:

the tubular connecting portion includes a pair of inner protrusions arranged apart from each other in a circumferential direction of the inner peripheral surface of the tubular connecting portion, projecting radially inwardly of the tubular connecting portion and extending in an axial direction, and the second contact point is arranged between the pair of inner protrusions in the circumferential direction of the inner peripheral surface of the tubular connecting portion and projects radially inward with a projection height smaller than those of the pair of inner protrusions, and both axial end parts of the second contact point are located axially inward of both axial end parts of the pair of inner protrusions.

3. The terminal unit of claim 1, wherein:

the resin cap is shaped to have a varying radial dimension in a circumferential direction of the resin cap and includes a plurality of projecting contact portions provided at a plurality of positions separated from each other in the circumferential direction of the resin cap where the radial dimension is maximum, the plurality of projecting contact portions projecting radially outward further than the outer peripheral surface of the columnar connecting portion, and the projecting contact portions of the resin cap contact parts of the inner peripheral surface of the tubular connecting portion separated from the second contact point in a circumferential direction of the inner peripheral surface and the second contact point is separated from the resin cap in press-fitting the columnar connecting portion into the tubular connecting portion.

4. The terminal unit of claim 3, wherein:

the resin cap includes three projecting contact portions provided at three positions separated from each other in the circumferential direction of the resin cap, and any of parts of an outer peripheral surface of the resin cap connecting between the projecting contact portions adjacent in the circumferential direction of the resin cap is a flat surface.

5. The terminal unit of claim 3, wherein an outer peripheral surface of the projecting contact portion is a flat surface extending in an axial direction of the resin cap while having a width.

6. The terminal unit of claim 3, wherein the resin cap is positioned in the circumferential direction of the resin cap with respect to the columnar connecting portion by engaging an engaging portion provided in the resin cap with an engaged portion provided on the columnar connecting portion.

7. The terminal unit of claim 1, wherein:

the tubular connecting portion is configured to include a first peripheral wall portion and a second peripheral wall portion arranged to face each other, a resilient member is provided to bias the first and second peripheral wall portions in directions approaching each other, and the first and second peripheral wall portions are resiliently deformed in directions separating from each other against a biasing force of the resilient member and the tubular connecting portion is expanded in diameter and deformed by the resin cap with the resin cap located in the tubular connecting portion.

8. The terminal unit of claim 7, wherein:

a pair of inner protrusions arranged apart from each other in the circumferential direction and projecting radially inward and the second contact point arranged between the pair of inner protrusions, projecting radially inward with a projection height smaller than those of the pair of inner protrusions and located axially inward of both axial end parts of the pair of inner protrusions are provided on an inner peripheral surface of the first peripheral wall portion, a pair of linear contact portions projecting radially inward and linearly extending while extending in the axial direction of the tubular connecting portion are provided at two positions separated in the circumferential direction on an inner peripheral surface of the second peripheral wall portion, and the second contact point of the first peripheral wall portion is arranged between the pair of linear contact portions of the second peripheral wall portion in a projection in a facing direction of the first and second peripheral wall portions.

9. The terminal unit of claim 8, wherein:

the second contact point provided on the inner peripheral surface of the first peripheral wall portion is constituted by an arcuate protrusion arranged in a circumferential central part and projecting radially inward while extending in the circumferential direction, and a plurality of the second contact points are constituted by the arcuate protrusion and the respective linear contact portions provided on the inner peripheral surface of the second peripheral wall portion.

10. The terminal unit of claim 1, wherein:

a tip side reduced diameter surface gradually reduced in diameter toward a tip side in the press-fitting direction is provided on the tip side in the press-fitting direction of the resin cap, and an entrance side reduced diameter surface gradually reduced in diameter toward the tip side in the press-fitting direction is provided on an inner circumferential end part of the tubular connecting portion on an entrance side of the columnar connecting portion.

11. The terminal unit of claim 1, wherein:

a base end side reduced diameter surface gradually reduced in diameter toward a base end side in the press-fitting direction is provided on the base end side in the press-fitting direction of the resin cap, and an exit side reduced diameter surface gradually reduced in diameter toward the base end side in the press-fitting direction is provided on an inner circumferential end part of the tubular connecting portion on an exit side of the columnar connecting portion.

12. A first terminal to be assembled with a second terminal including a tubular connecting portion resiliently deformable in a diameter expanding direction, comprising:

a columnar connecting portion to be press-fit into the tubular connecting portion; and a resin cap for covering a tip surface of the columnar connecting portion in a press-fitting direction into the tubular connecting portion, the resin cap having a maximum outer diameter larger than that of the columnar connecting portion, an outer peripheral surface of the columnar connecting portion constituting a first contact point to be pressed into contact with a second contact point provided on the tubular connecting portion, and the resin cap being arranged to project from the tubular connecting portion toward a tip side in the press-fitting direction at an assembly completed position of the columnar connecting portion with the tubular connecting portion.

13. The first terminal of claim 12, wherein a tip side reduced diameter surface gradually reduced in diameter toward a tip side in the press-fitting direction is provided on the tip side in the press-fitting direction of the resin cap.

14. The first terminal of claim 12, wherein a base end side reduced diameter surface gradually reduced in diameter toward a base end side in the press-fitting direction is provided on the base end side in the press-fitting direction of the resin cap.

15. The first terminal of claim 12, wherein:

the resin cap is shaped to have a varying radial dimension in a circumferential direction of the resin cap and includes a plurality of projecting contact portions provided at a plurality of positions separated from each other in the circumferential direction of the resin cap where the radial dimension is maximum, the plurality of projecting contact portions projecting radially outward further than the outer peripheral surface of the columnar connecting portion, and the projecting contact portions of the resin cap contact parts of the inner peripheral surface of the tubular connecting portion separated from the second contact point in a circumferential direction of the inner peripheral surface.

16. The first terminal of claim 15, wherein:

the resin cap includes three projecting contact portions provided at three positions separated from each other in the circumferential direction of the resin cap, and any of parts of an outer peripheral surface of the resin cap connecting between the projecting contact portions adjacent in the circumferential direction of the resin cap is a flat surface.

17. The first terminal of claim 15, wherein an outer peripheral surface of the projecting contact portion is a flat surface extending in an axial direction of the resin cap while having a width.

18. The first terminal unit of claim 15, wherein the resin cap is positioned in the circumferential direction of the resin cap with respect to the columnar connecting portion by engaging an engaging portion provided in the resin cap with an engaged portion provided on the columnar connecting portion.

* * * * *